(12) United States Patent
Lee et al.

(10) Patent No.: US 7,869,844 B2
(45) Date of Patent: Jan. 11, 2011

(54) SLIDING MECHANISM FOR OPENING AND CLOSING OF CELLULAR PHONE

(75) Inventors: Jun-Hong Lee, Bucheon-si (KR); Hyung-Kyu Yoon, Bucheon-si (KR)

(73) Assignee: Laird Technologies, Inc., Chesterfield, MO (US)

( * ) Notice: Subject to any disclaimer, the term of this patent is extended or adjusted under 35 U.S.C. 154(b) by 619 days.

(21) Appl. No.: 11/596,215
(22) PCT Filed: Sep. 15, 2005
(86) PCT No.: PCT/KR2005/003075

§ 371 (c)(1),
(2), (4) Date: Nov. 9, 2007

(87) PCT Pub. No.: WO2006/031078

PCT Pub. Date: Mar. 23, 2006

(65) Prior Publication Data

US 2008/0058039 A1    Mar. 6, 2008

(30) Foreign Application Priority Data

| Sep. 15, 2004 | (KR) | 10-2004-0073748 |
| Oct. 8, 2004 | (KR) | 10-2004-0080462 |
| Jan. 31, 2005 | (KR) | 20-2005-0002869 U |
| Feb. 4, 2005 | (KR) | 10-2005-0010549 |
| Feb. 16, 2005 | (KR) | 10-2005-0012594 |
| Mar. 22, 2005 | (KR) | 10-2005-0023528 |
| Jun. 21, 2005 | (KR) | 10-2005-0053445 |
| Aug. 24, 2005 | (KR) | 10-2005-0077885 |

(51) Int. Cl.
*H04M 1/00* (2006.01)
(52) U.S. Cl. .................. 455/575.4; 455/575.1
(58) Field of Classification Search .............. 455/571.1, 455/575.4; 361/600, 679.02; 379/433.11, 379/433.12
See application file for complete search history.

(56) References Cited

U.S. PATENT DOCUMENTS 3,955,595 A    5/1976   Modes
(Continued)

FOREIGN PATENT DOCUMENTS

CN    1961491    5/2007
(Continued)

OTHER PUBLICATIONS

U.S. Office Action, dated Jun. 24, 2010, 10 pages, from U.S. Appl. No. 11/834,251.
(Continued)

*Primary Examiner*—Lester Kincaid
*Assistant Examiner*—Daniel Lai
(74) *Attorney, Agent, or Firm*—Harness, Dickey & Pierce, P.L.C.

(57) ABSTRACT

Disclosed is a sliding mechanism for opening and closing a cellular phone. The mechanism includes a main plate, a slider plate slidably connected to the main plate, a first block shaft-rotatably fixed to the main plate, one or more first rod member fixed to the first block, a first resilient member connected to the first block and generating expansion force, a second block shaft-rotatably fixed to the slider plate, one or more second rod member fixed to the second block, a second resilient member connected to the second rod member and generating expansion force, and a connection block placed in the central area of the first and second blocks and supporting the end portions of the first and second resilient members. The connection block slidably connects the first and second rod members with the first and second blocks in such a way that the end portion of the first rod member is directed towards the second block and the end portion of the second rod member is directed towards the first block. The first and second resilient members are formed of a compression spring having a good resiliency and service life, thereby improving reliability of cellular phones.

14 Claims, 35 Drawing Sheets

U.S. PATENT DOCUMENTS

| | | | |
|---|---|---|---|
| D260,234 | S | 8/1981 | Johnson, Jr. |
| D280,596 | S | 9/1985 | Keeler |
| 4,675,948 | A | 6/1987 | Bengtsson |
| 5,715,932 | A | 2/1998 | Motoyama et al. |
| D423,916 | S | 5/2000 | Kalat |
| D438,782 | S | 3/2001 | Kalat |
| 6,370,362 | B1 | 4/2002 | Hansen et al. |
| D457,931 | S | 5/2002 | Kalat |
| 6,773,002 | B2 | 8/2004 | Adoline et al. |
| 7,162,283 | B2 | 1/2007 | Bae et al. |
| 7,722,281 | B2 | 5/2010 | Naslund et al. |
| 2003/0153280 | A1 | 8/2003 | Kopp et al. |
| 2004/0085739 | A1* | 5/2004 | Lee et al. .................... 361/727 |
| 2004/0203496 | A1 | 10/2004 | Bae et al. |
| 2005/0078817 | A1* | 4/2005 | Lee ....................... 379/433.12 |
| 2007/0091555 | A1 | 4/2007 | Lee |
| 2008/0073196 | A1 | 3/2008 | Chung |
| 2008/0146297 | A1 | 6/2008 | Ho |
| 2009/0029749 | A1 | 1/2009 | Lee |
| 2009/0035056 | A1 | 2/2009 | Kim et al. |

FOREIGN PATENT DOCUMENTS

| | | |
|---|---|---|
| CN | 1976365 | 6/2007 |
| CN | 101370040 A | 2/2009 |
| EP | 1422911 A2 | 5/2004 |
| EP | 174555 | 12/2008 |
| EP | 2020804 A1 | 2/2009 |
| JP | 61-24893 | 2/1986 |
| JP | 61-58746 | 4/1986 |
| JP | 02-500535 | 2/1990 |
| JP | 08-145100 | 6/1996 |
| JP | 10-190795 | 7/1998 |
| JP | 2005311510 | 11/2005 |
| JP | 2006-050204 | 2/2006 |
| JP | 2006081107 | 3/2006 |
| JP | 2008501288 | 1/2008 |
| KR | 20-2003-0000136 | 3/2003 |
| KR | 20-0308165 | 3/2003 |
| KR | 319967 | 7/2003 |
| KR | 10-2004-0003257 | 1/2004 |
| KR | 345703 | 3/2004 |
| KR | 20040044213 | 5/2004 |
| KR | 20-0382516 | 4/2005 |
| KR | 20-0414034 | 4/2006 |
| KR | 10-0627605 | 9/2006 |
| KR | 10-2006-0122583 | 11/2006 |
| KR | 10-0650695 | 11/2006 |
| KR | 10-0661992 | 12/2006 |
| KR | 10-0668263 | 1/2007 |
| KR | 10-0689069 | 2/2007 |
| KR | 10-0692311 | 3/2007 |
| KR | 10-0698458 B1 | 3/2007 |
| WO | WO88/03617 | 5/1988 |
| WO | WO 03/067776 A1 | 8/2003 |
| WO | WO2006/031078 | 3/2006 |

OTHER PUBLICATIONS

European 1st Office Action, dated May 31, 2007, 4 pages from EP Application No. 05808779.2. The instant U.S. application and European patent application both claim priority to the same PCT International Application No. PCT/KR2005/003075 (now published as WO 2006/031078).

European 2nd Office Action, dated Jan. 17, 2008, 2 pages from EP Application No. 05808779.2. The instant U.S. application and European application both claim priority to the same PCT International Application No. PCT/KR2005/003075 (now published as WO 2006/031078).

Chinese Office Action, dated Mar. 27, 2009, 5 pages, from CN Application No. 200580017848.X. The instant U.S. application and Chinese patent application are both national phase entries from the same PCT International Application No. PCT/KR2005/003075 (now published as WO 2006/031078).

Japanese Office Action, dated Aug. 5, 2009, 5 pages, from JP Application No. 2007-514931. The instant U.S. application and Japanese patent application are both national phase entries from the same PCT International Application No. PCT/KR2005/003075 (now published as WO 2006/031078).

Notice of Decision of Granting Patent Right for Invention, dated Nov. 6, 2009, from Chinese Application No. 200580017484.X (now ZL 200580017484.X), 4 pages. The instant U.S. application and Chinese patent application No. 200580017484.X (now ZL200580017484.X) are both national phase entries from the same PCT international application No. PCT/KR05/003075 (now Published as WO 2006/031078).

European search report, dated May 6, 2009, 8 pages, from EP divisional Application No. 08171508.8 (now published as EP2063541). The instant U.S. application and European divisional application No. 0817508.8 both claim priority to the same PCT international application No. PCT/KR05/003075 (now published as WO 2006/031078).

Japanese Notice of Allowance, dated Apr. 27, 2010, 3 pages, from Japanese Application No. 2007-514931, (published as JP2008-501288).The instant U.S. application and Japanese patent application No. 2007-514931 are both national phase entries from the same PCT international application No. PCT/KR05/003075 (now Published as WO 2006/031078).

First Office Action from Chinese Patent Application No. 200810098496.5, date of issue: Feb. 5, 2010; 11 pages.

* cited by examiner

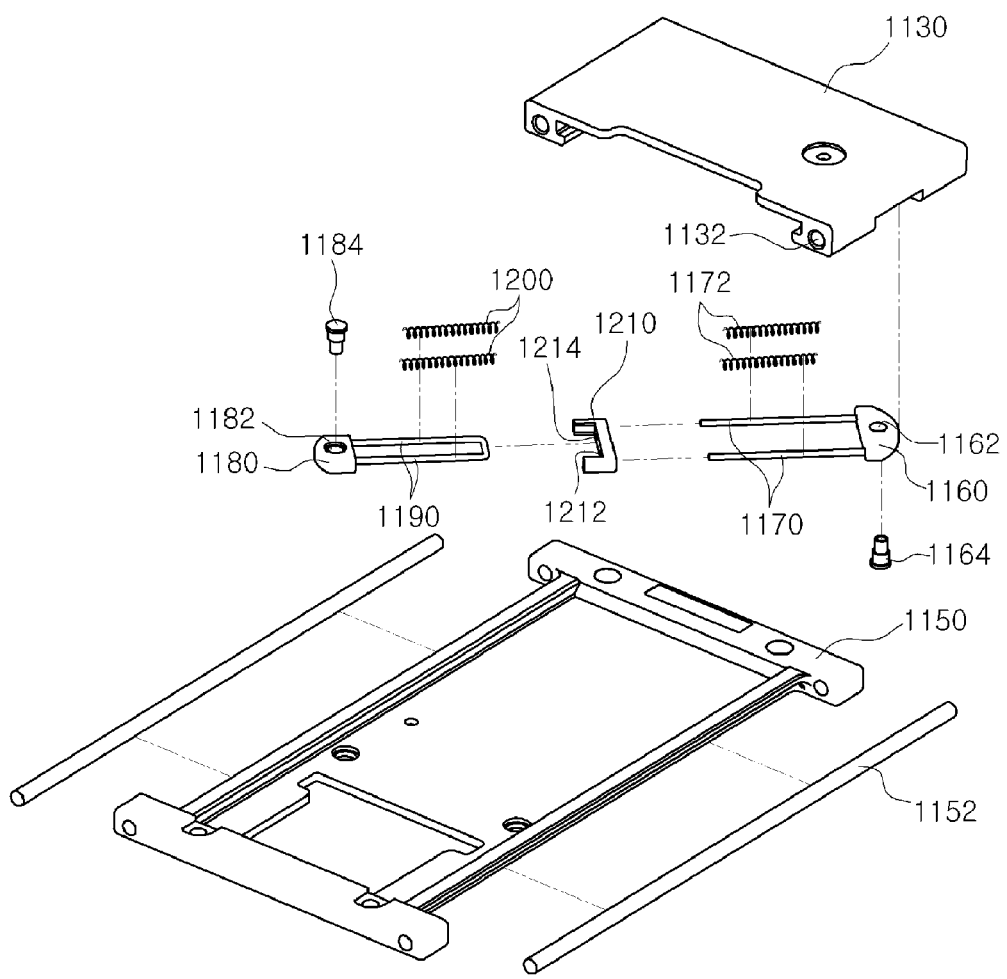

[Fig. 2]
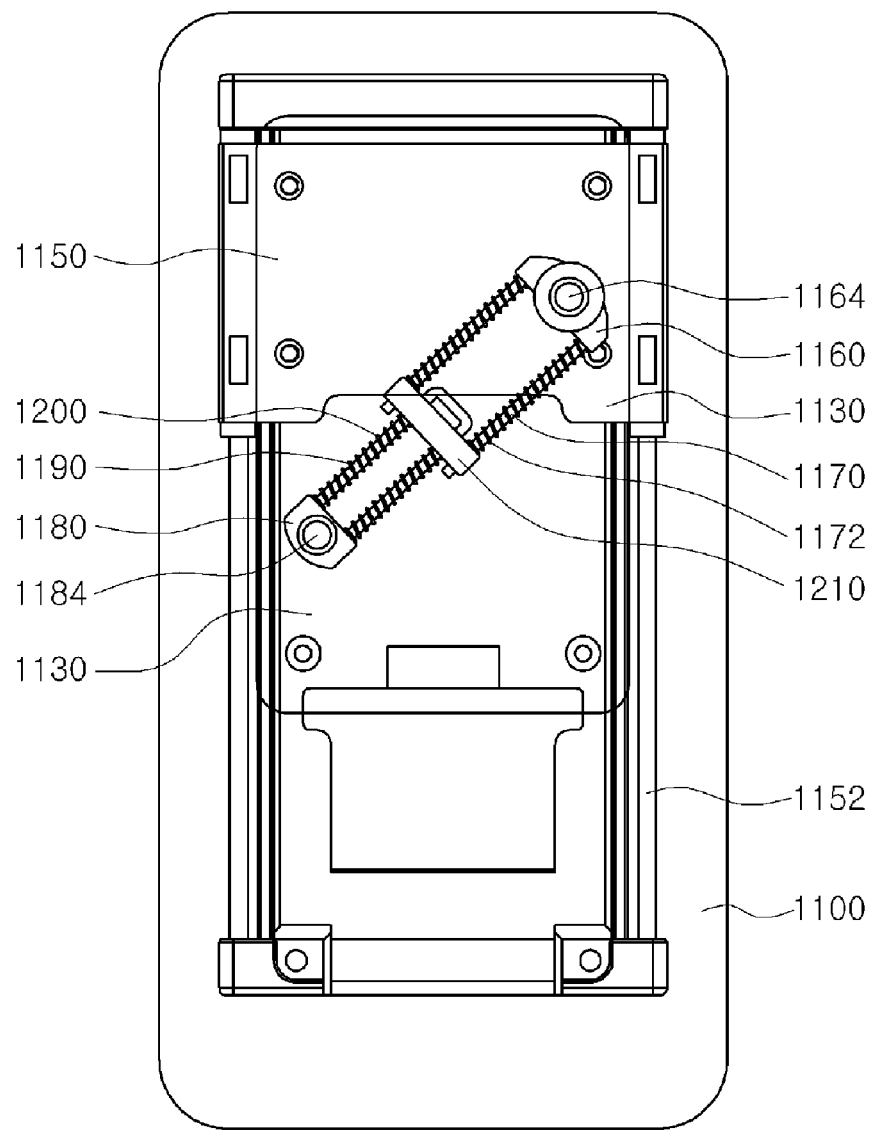

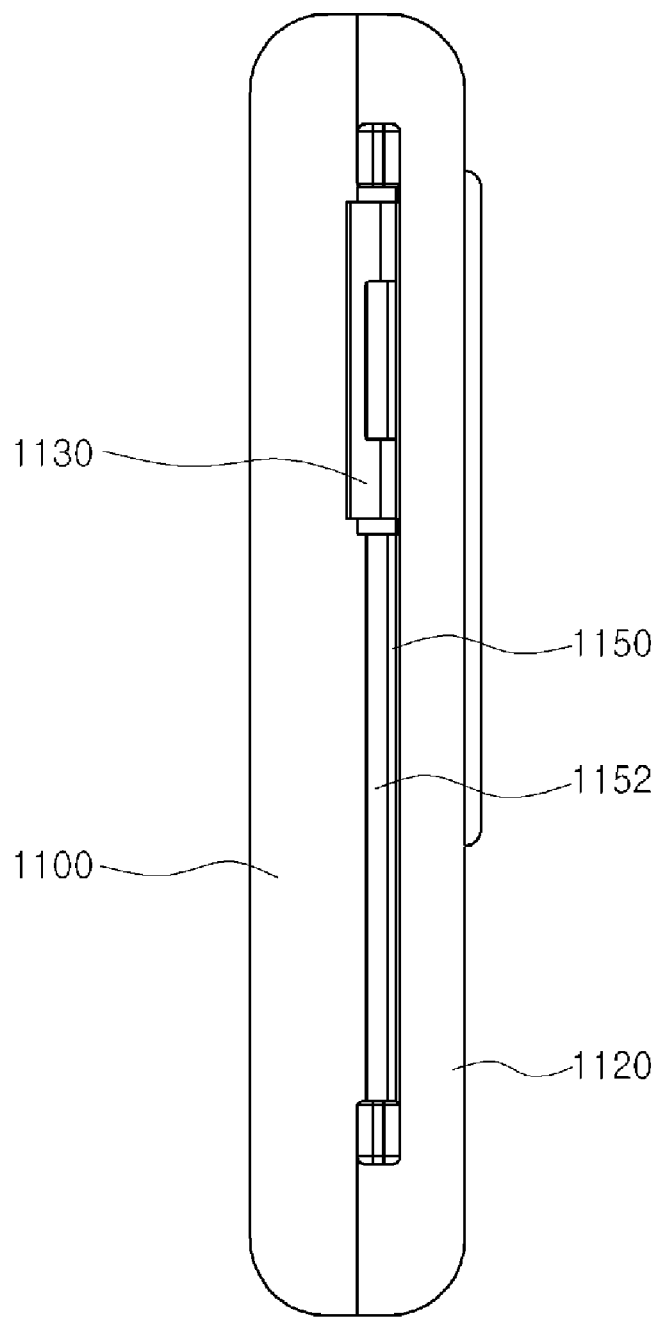
[Fig. 3]

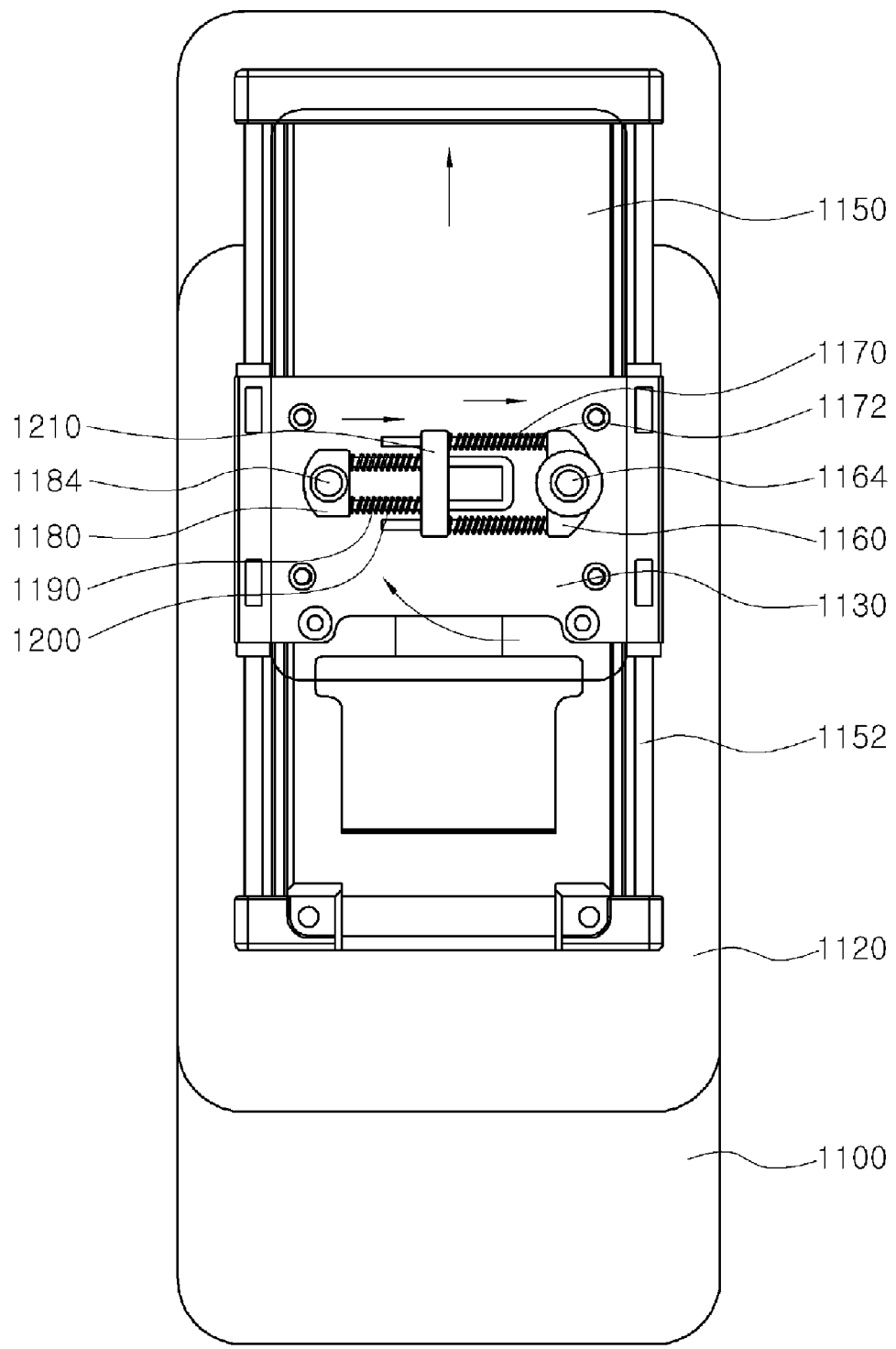
[Fig. 4]

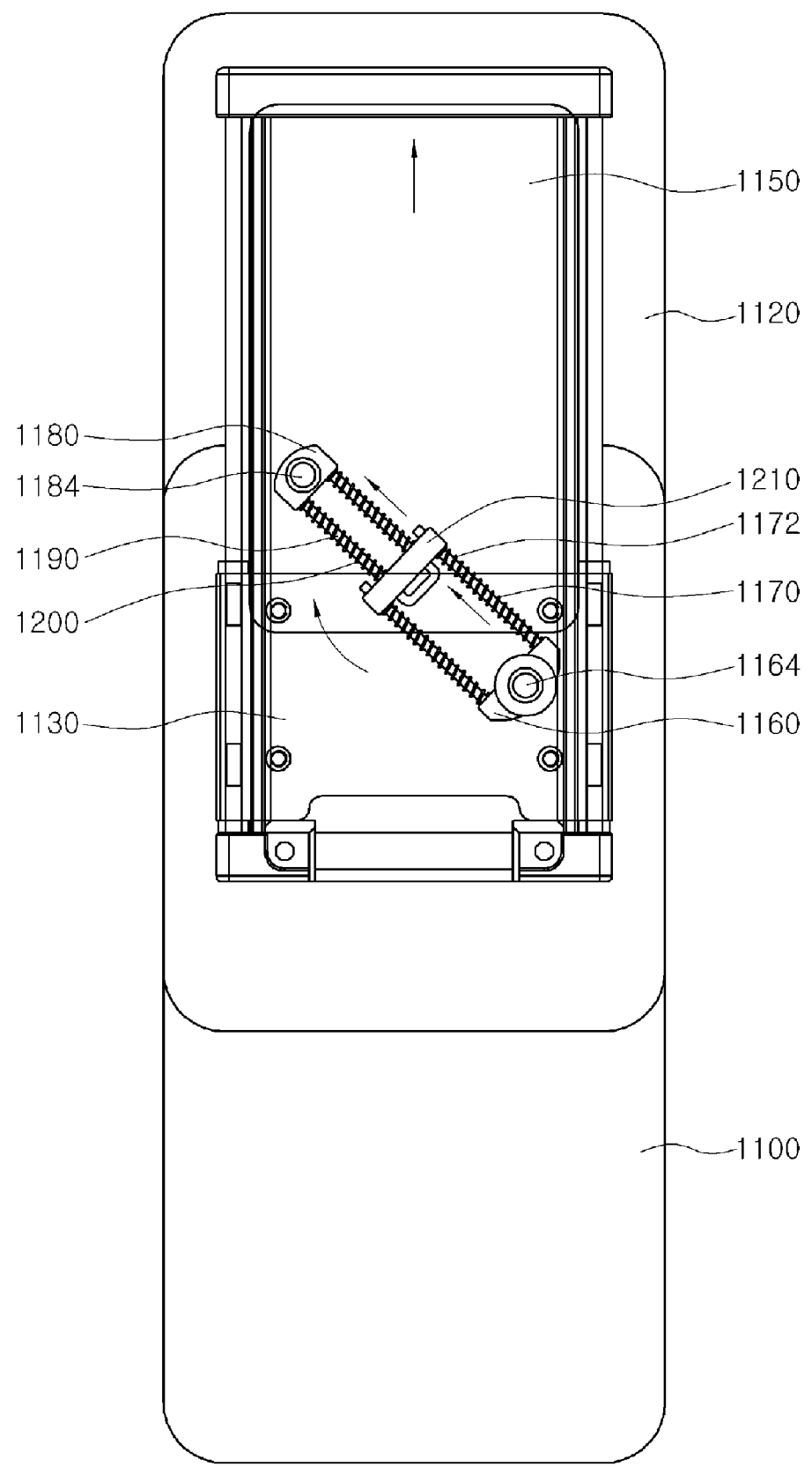
[Fig. 5]

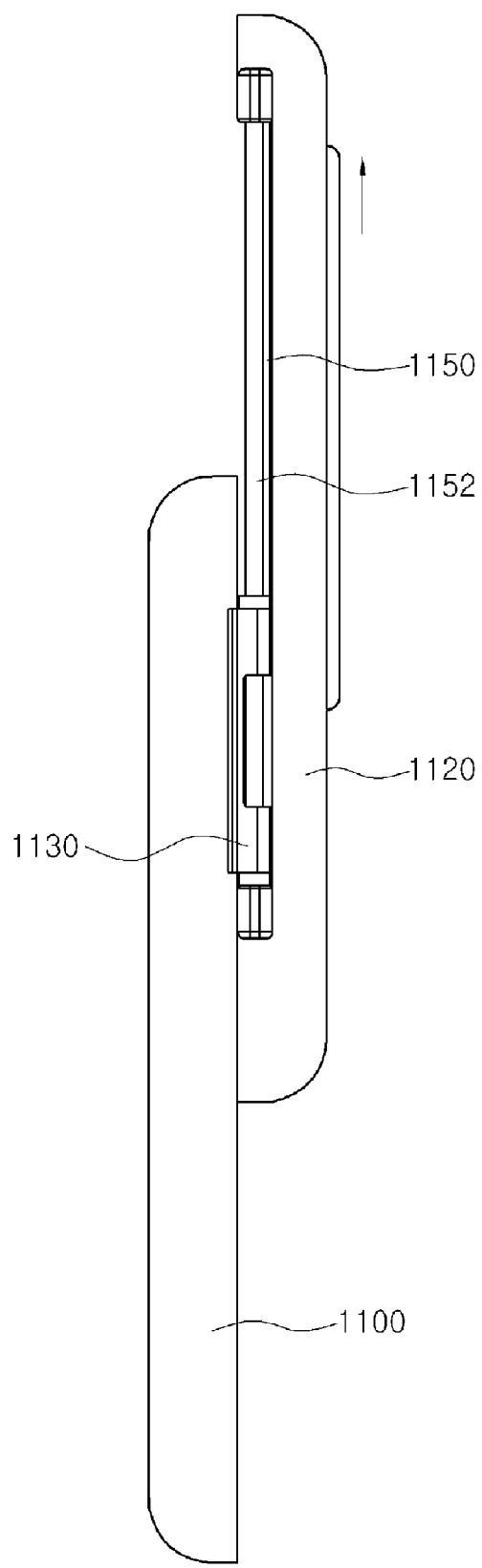
[Fig. 6]

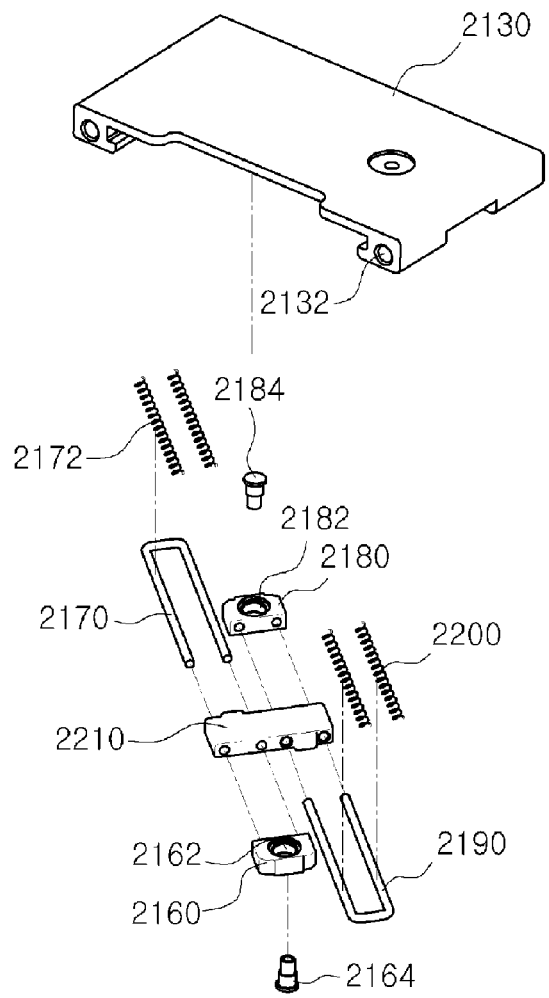
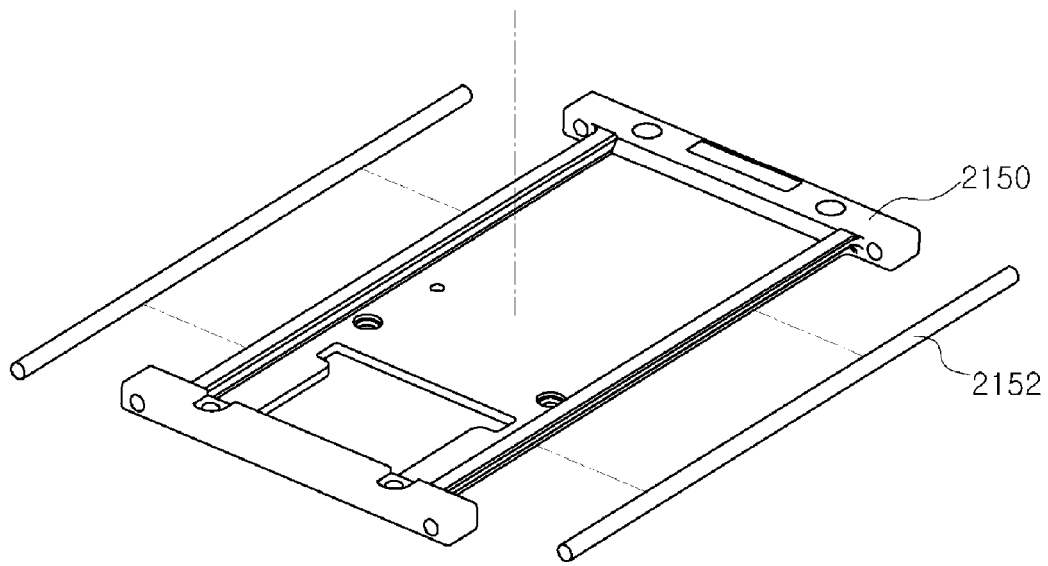
[Fig. 7]

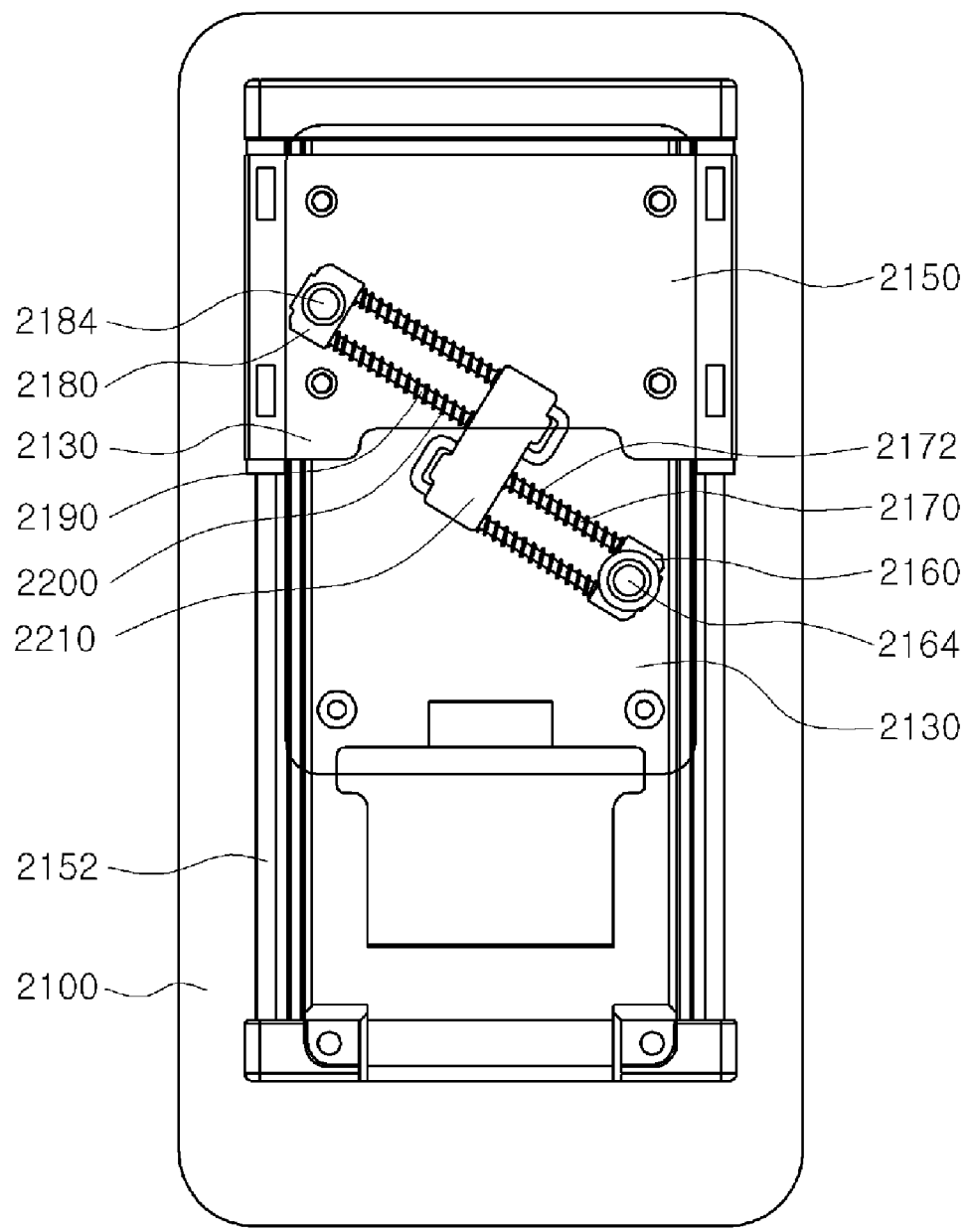
[Fig. 8]

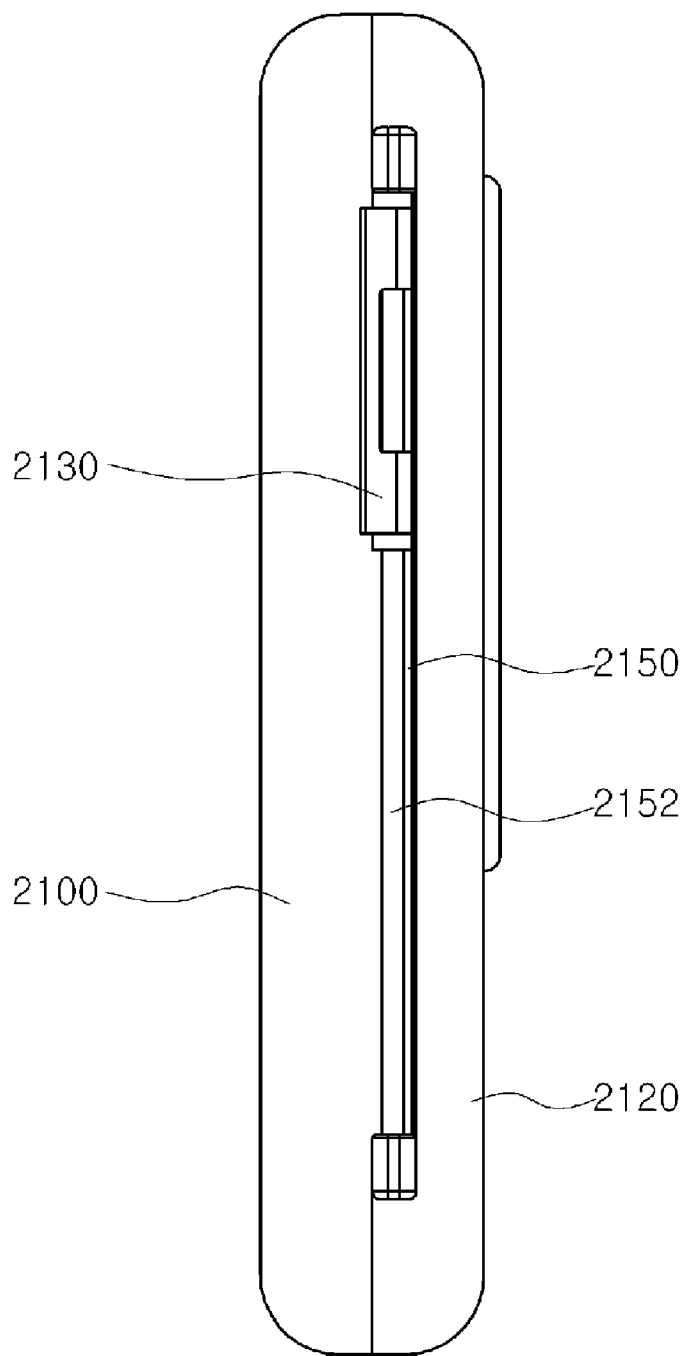
[Fig. 9]

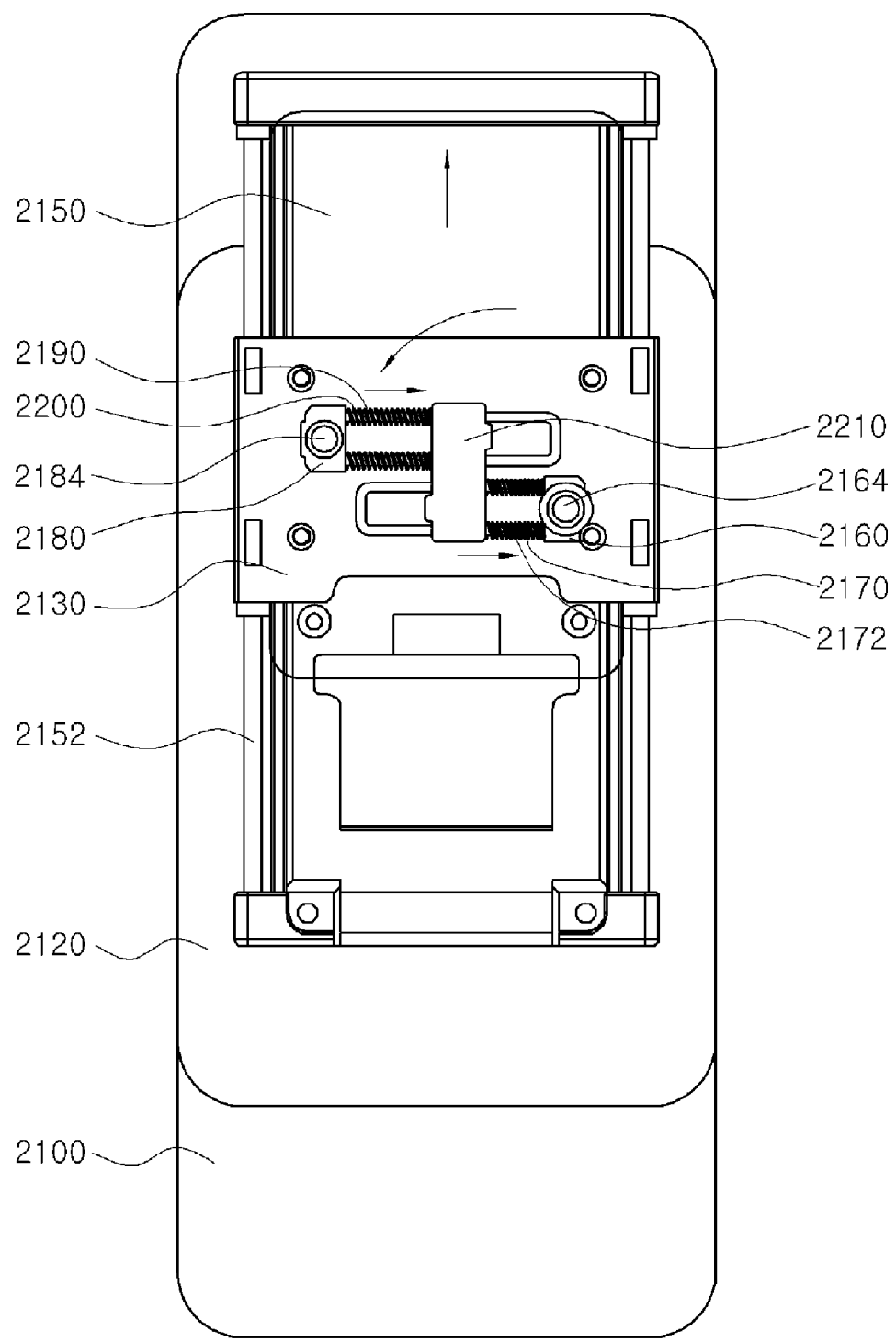
[Fig. 10]

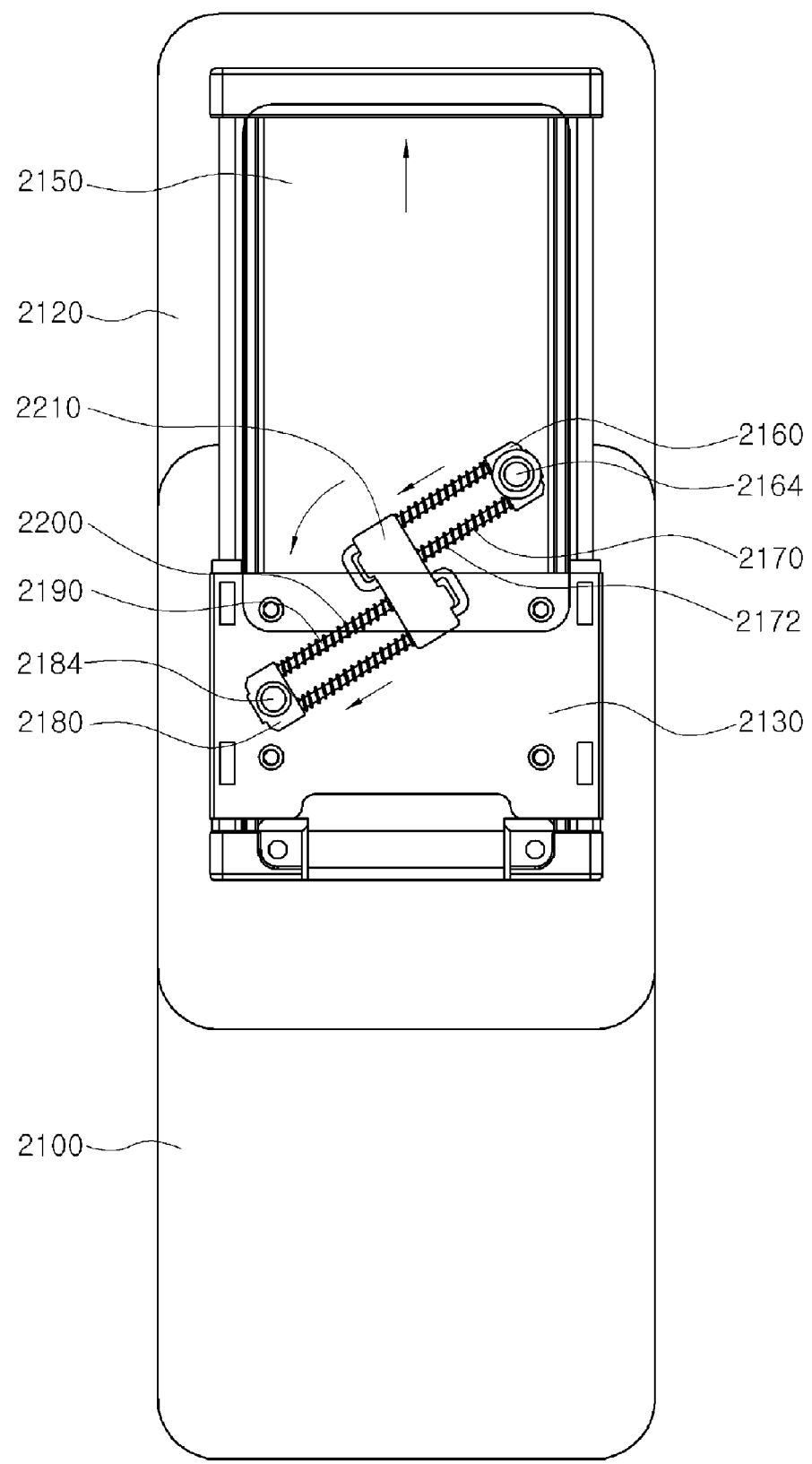
[Fig. 11]

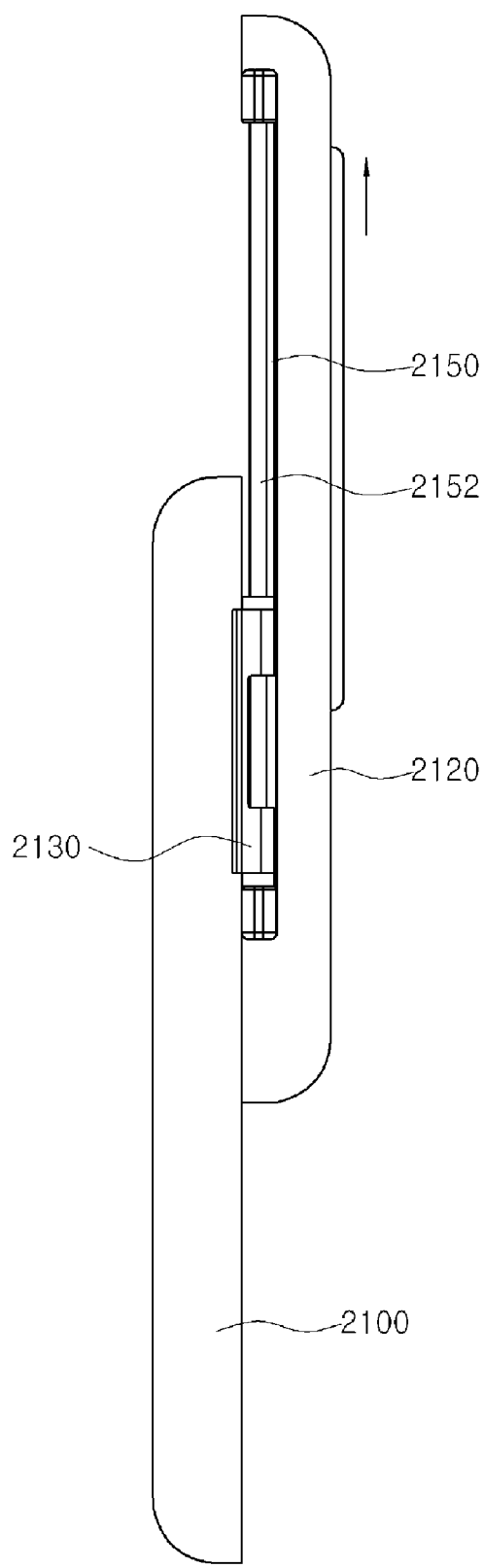
[Fig. 12]

[Fig. 13]
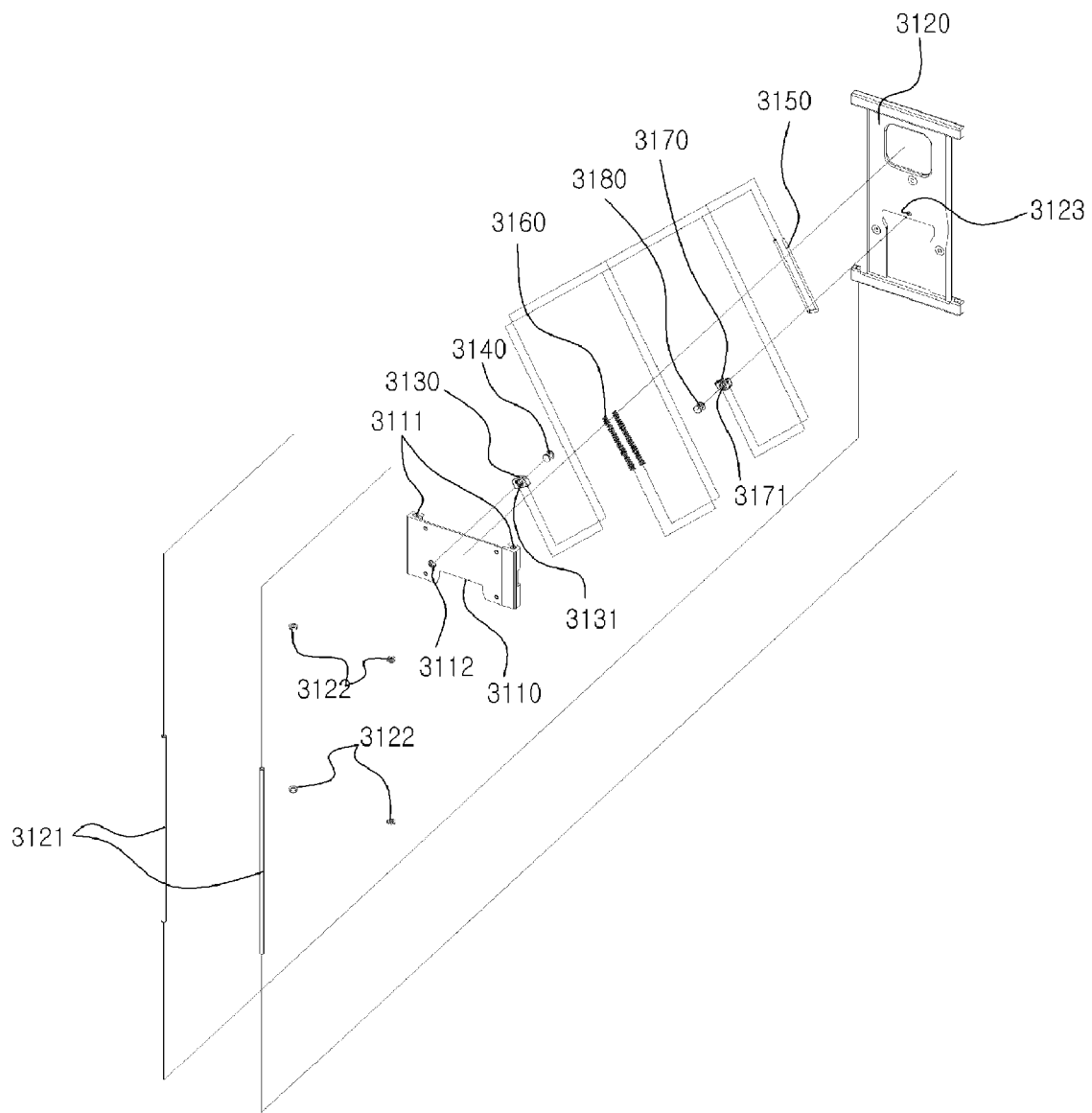

[Fig. 14]
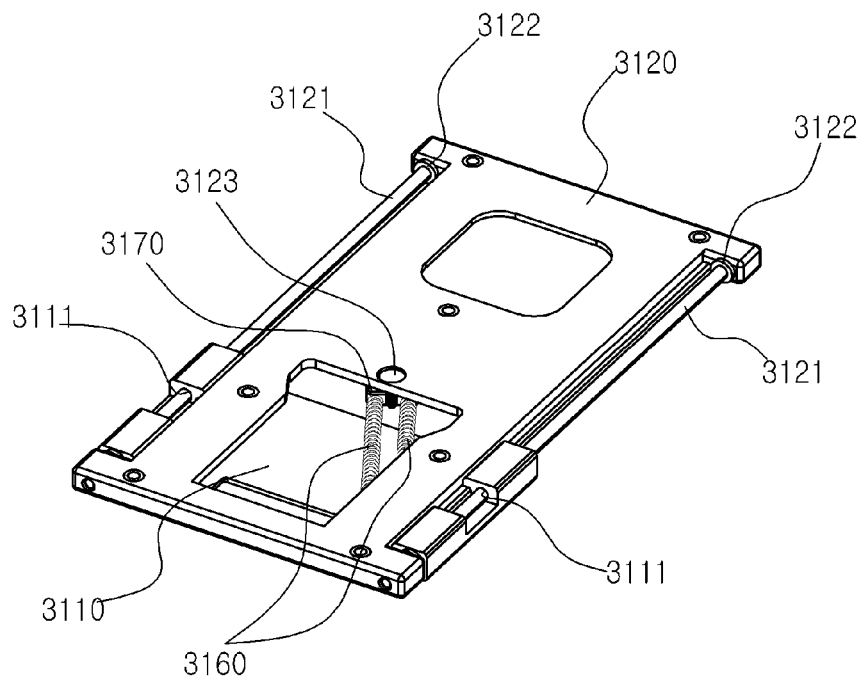
[Fig. 15]
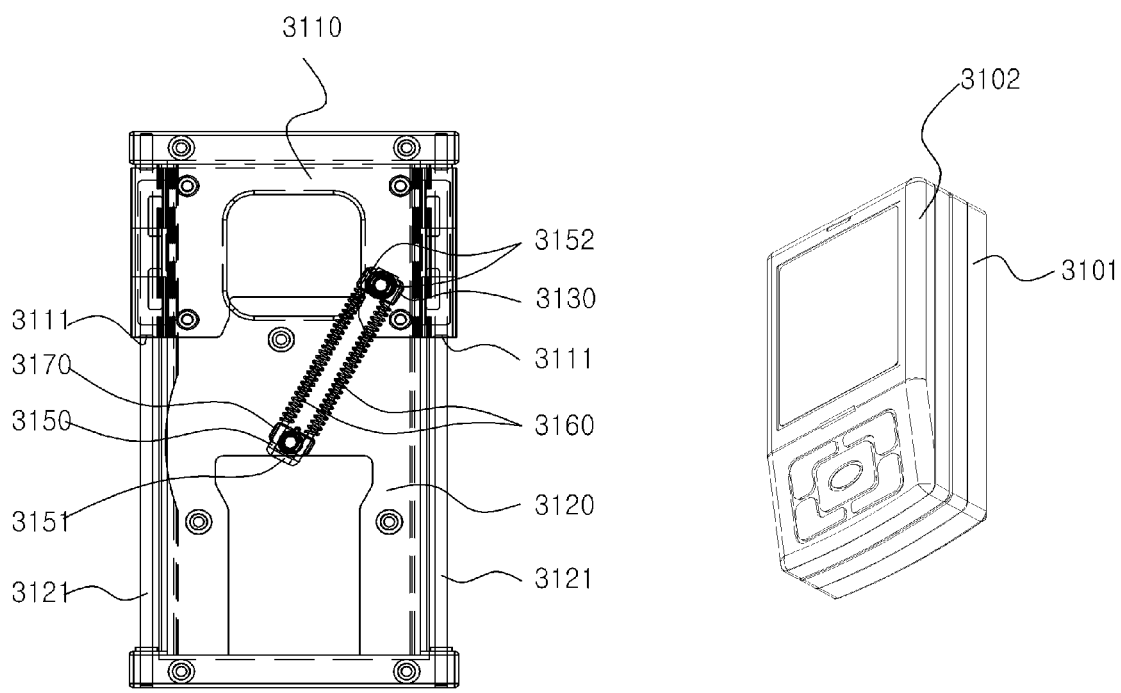

[Fig. 16]
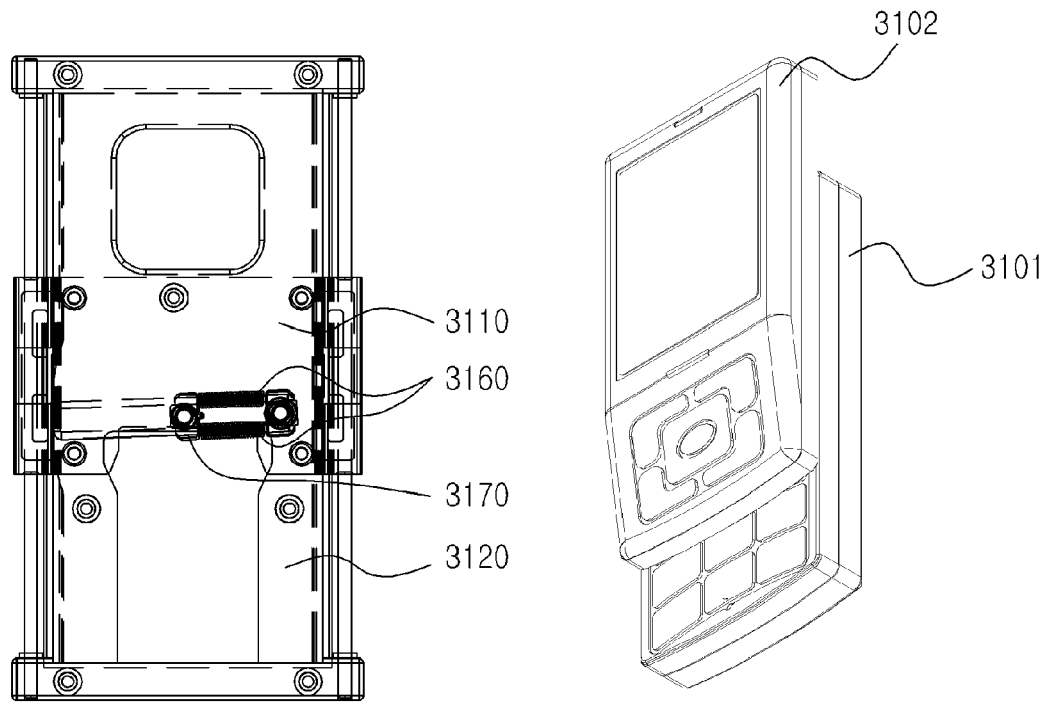
[Fig. 17]
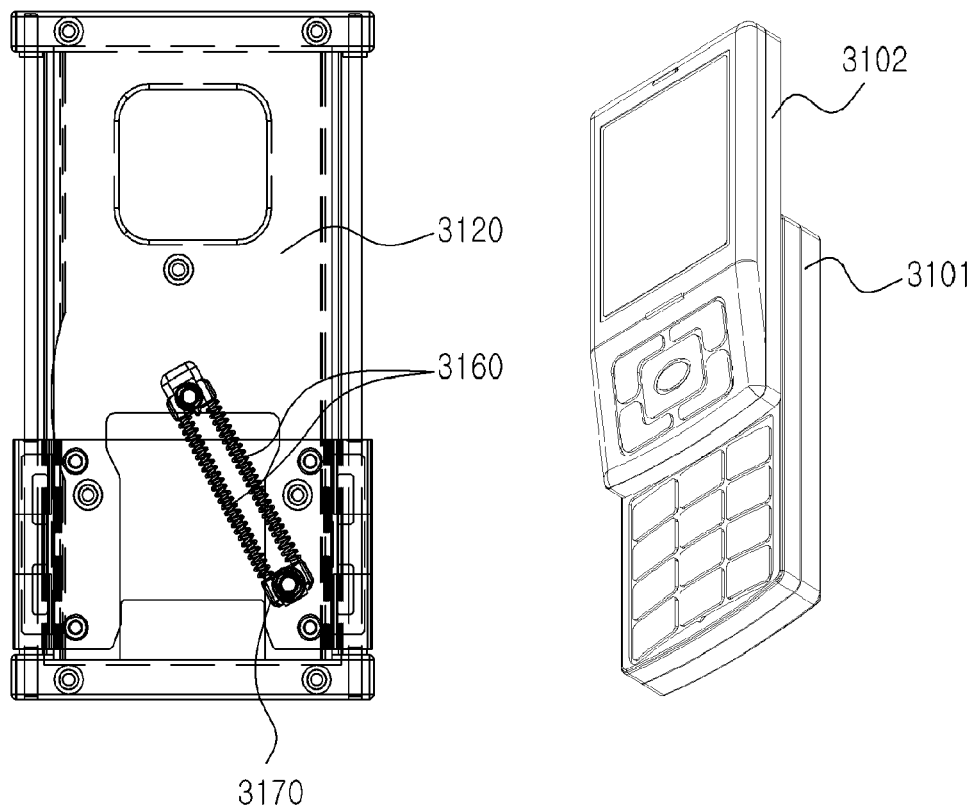

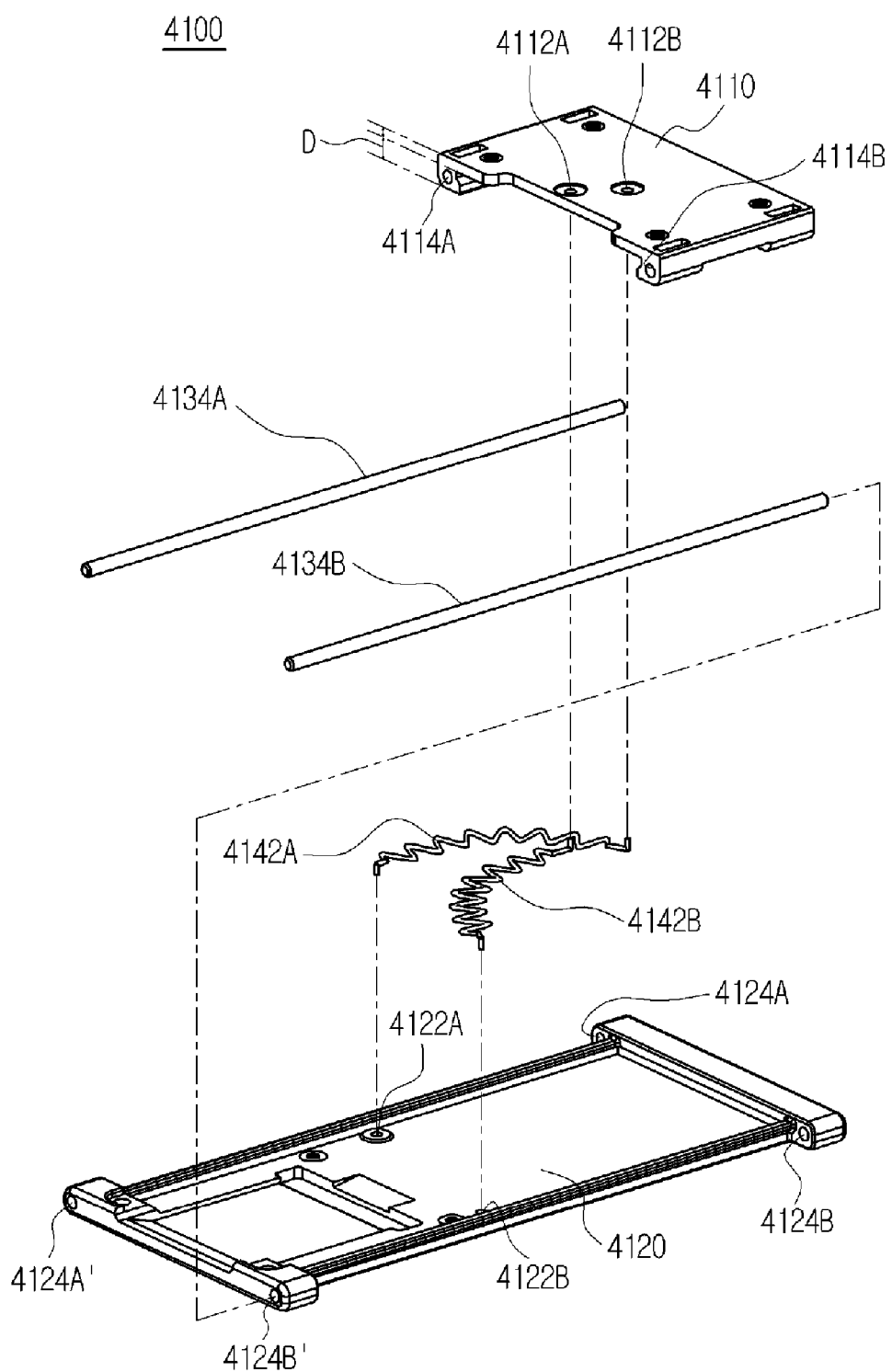
[Fig. 18]

[Fig. 19]
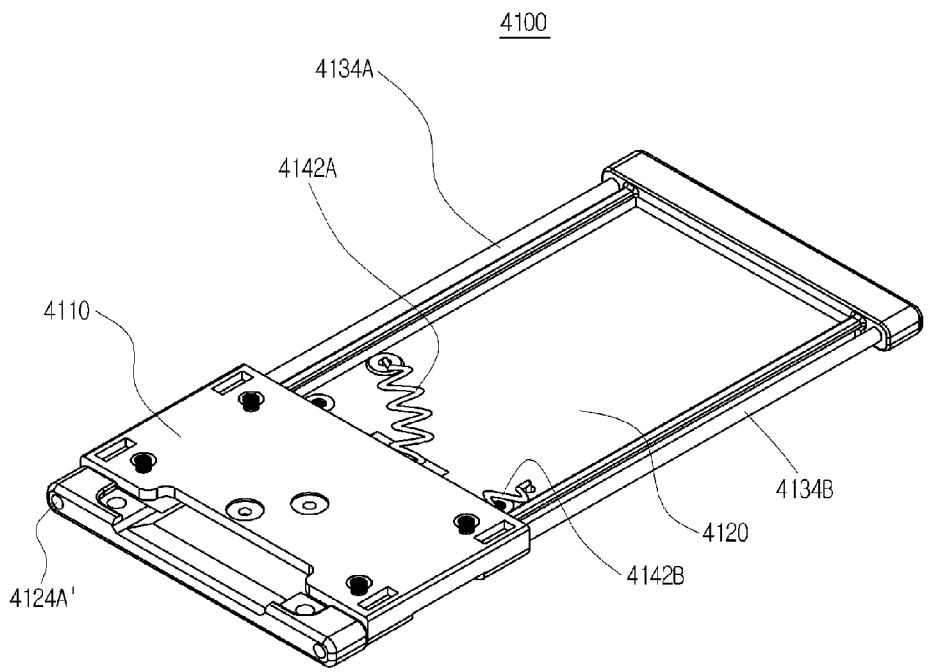
[Fig. 20]
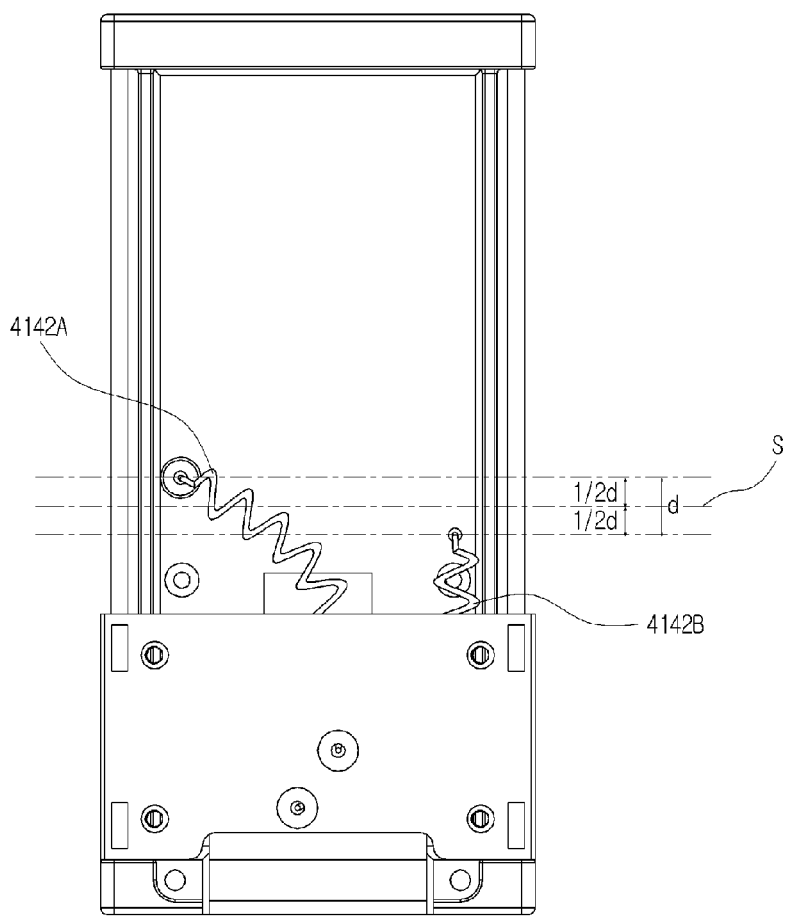

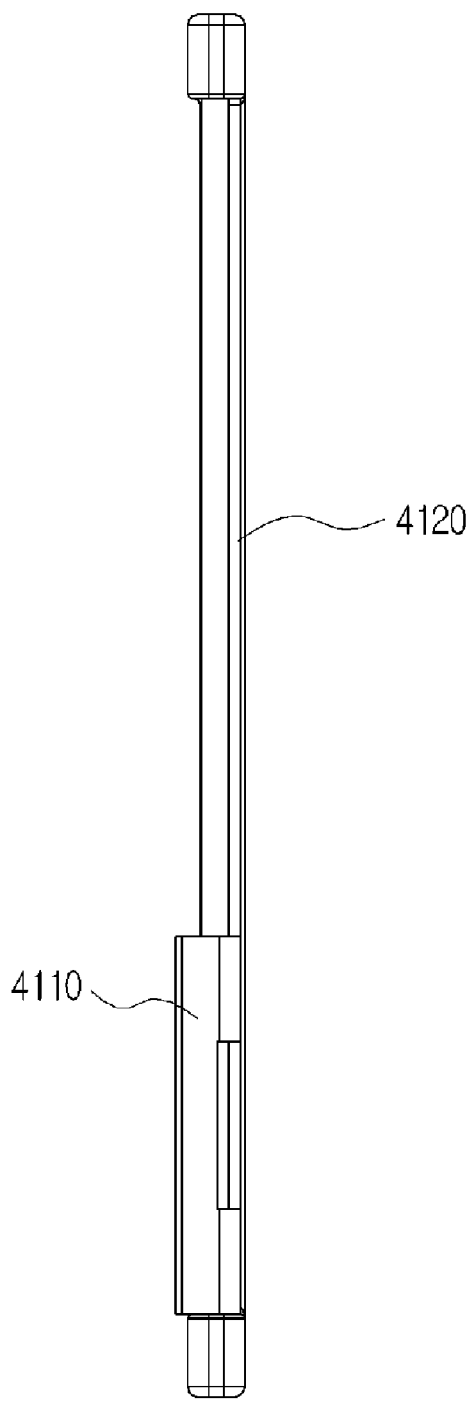
[Fig. 21]

[Fig. 22]
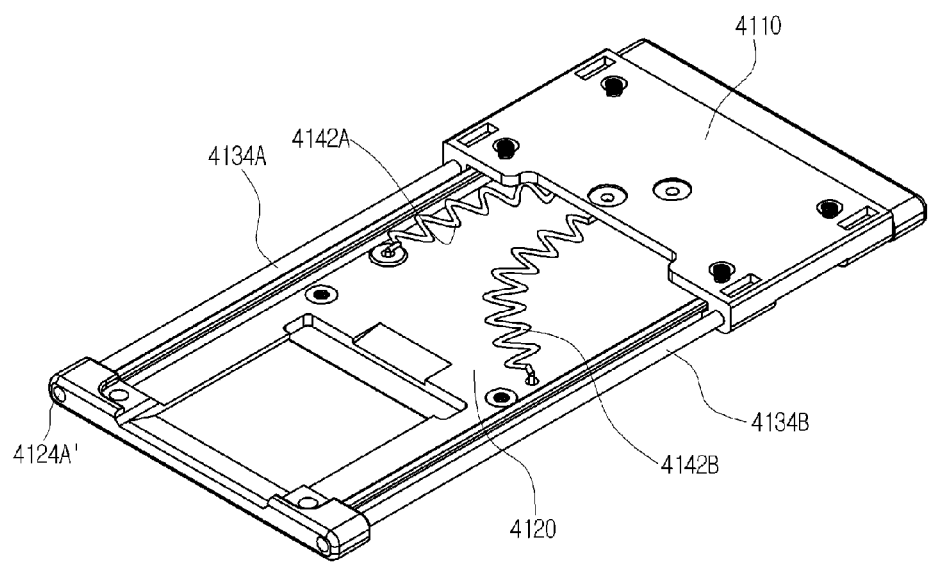
[Fig. 23]
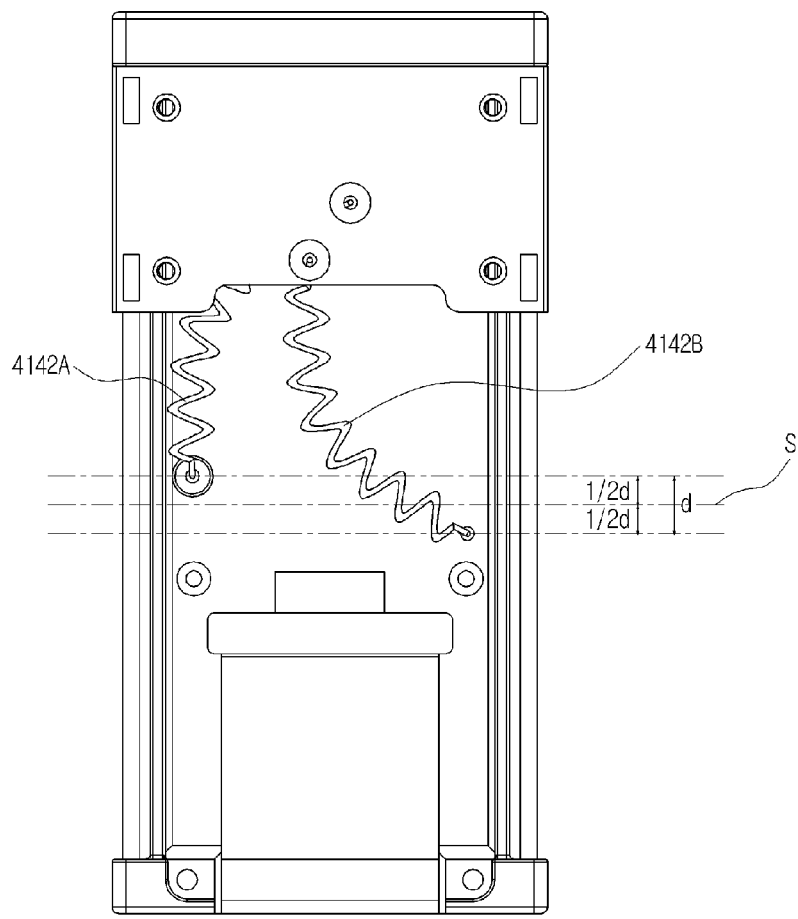

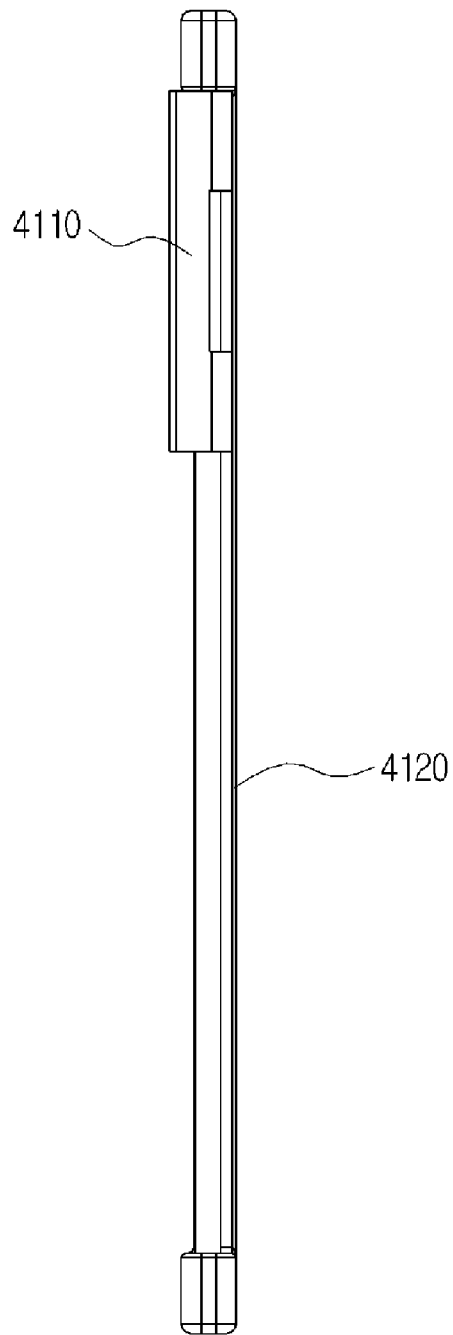
[Fig. 24]

[Fig. 25]
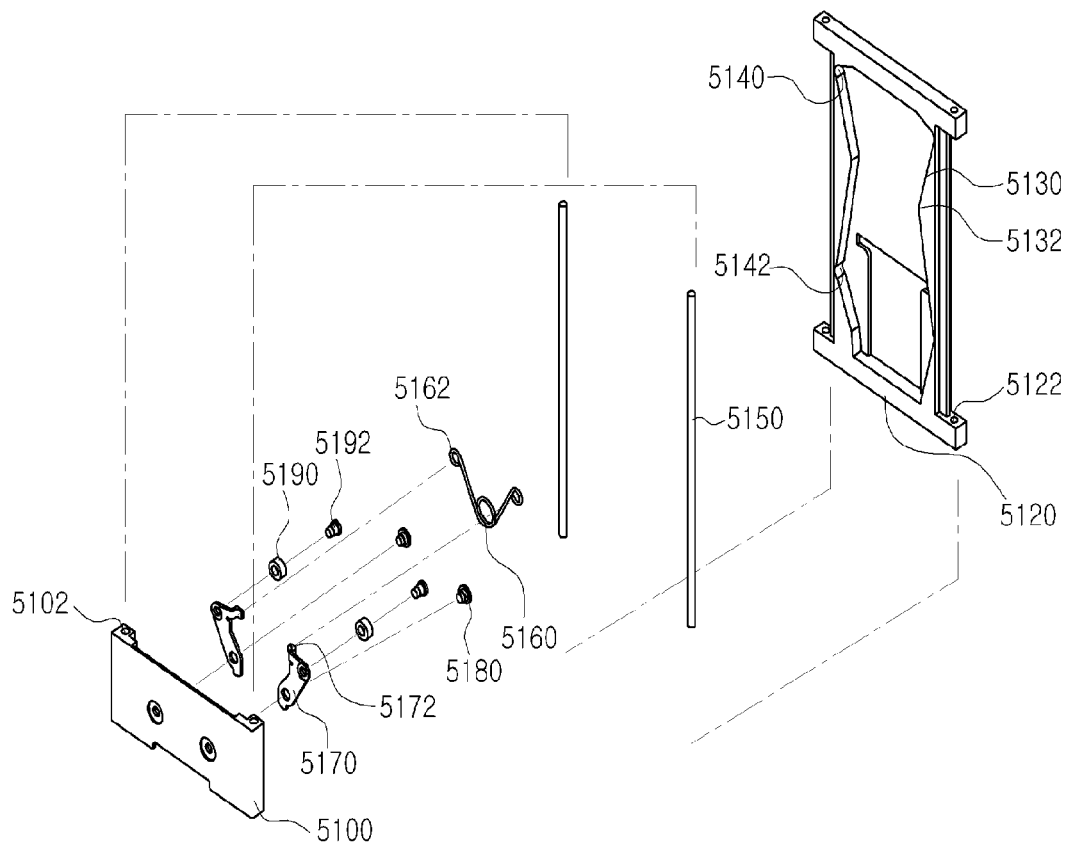
[Fig. 26]
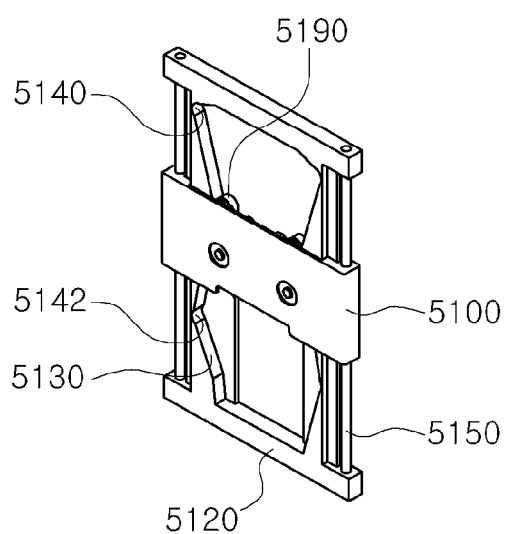

[Fig. 27]
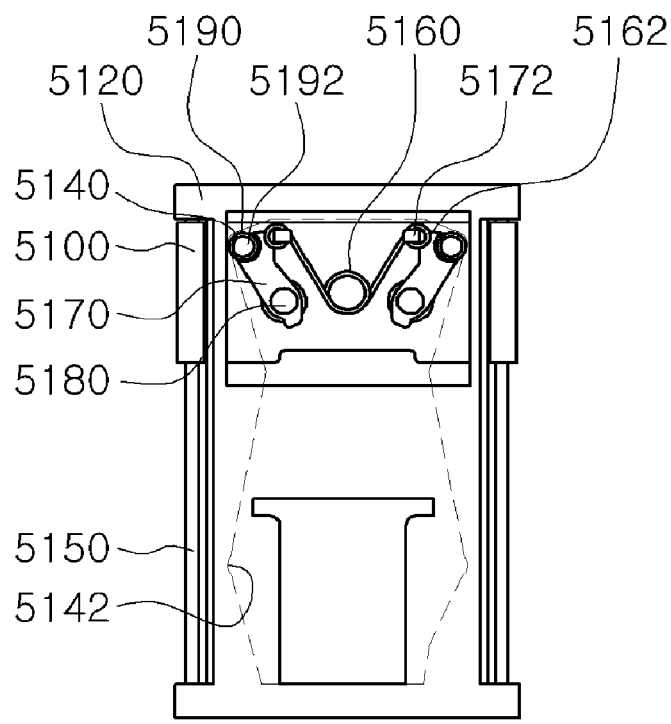
[Fig. 28]
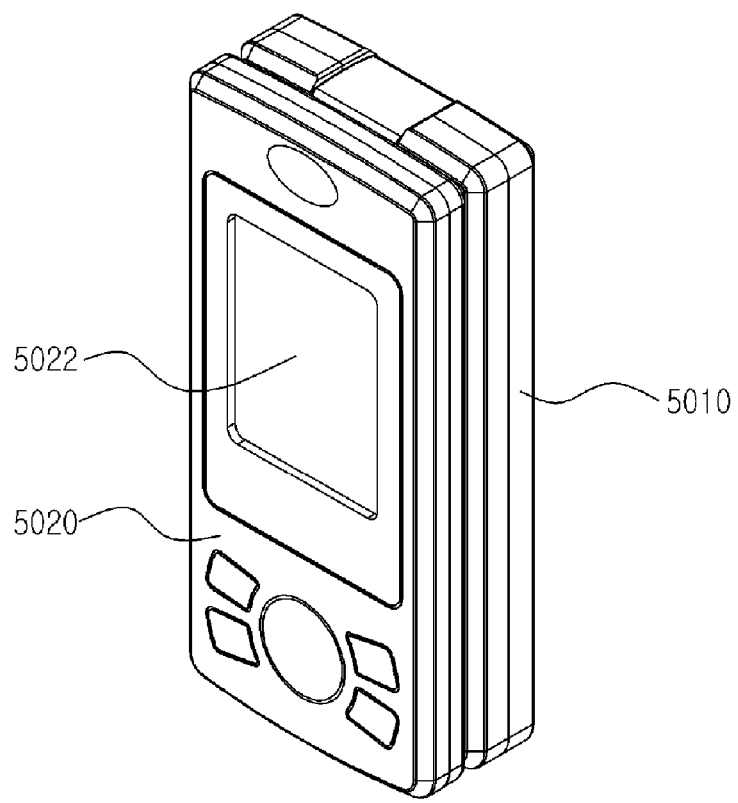

[Fig. 29]
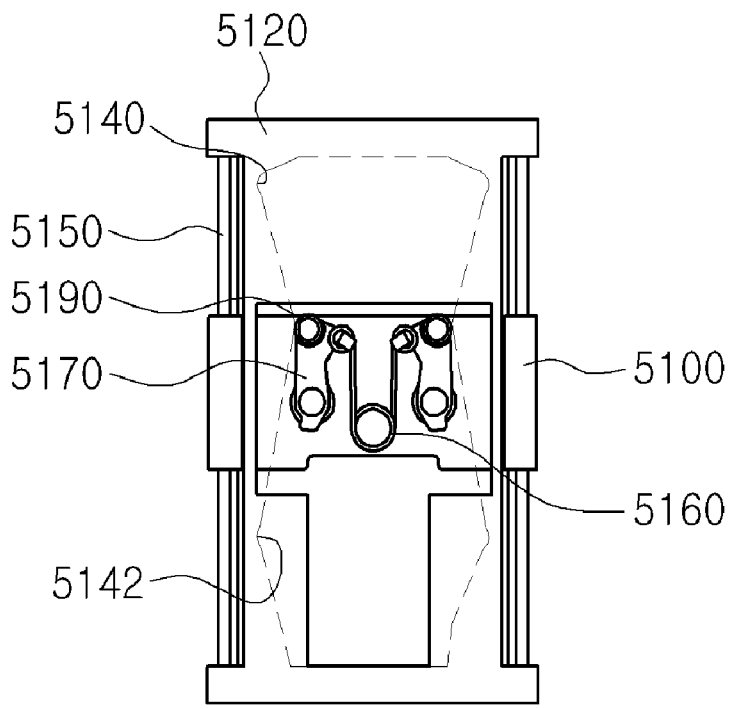
[Fig. 30]
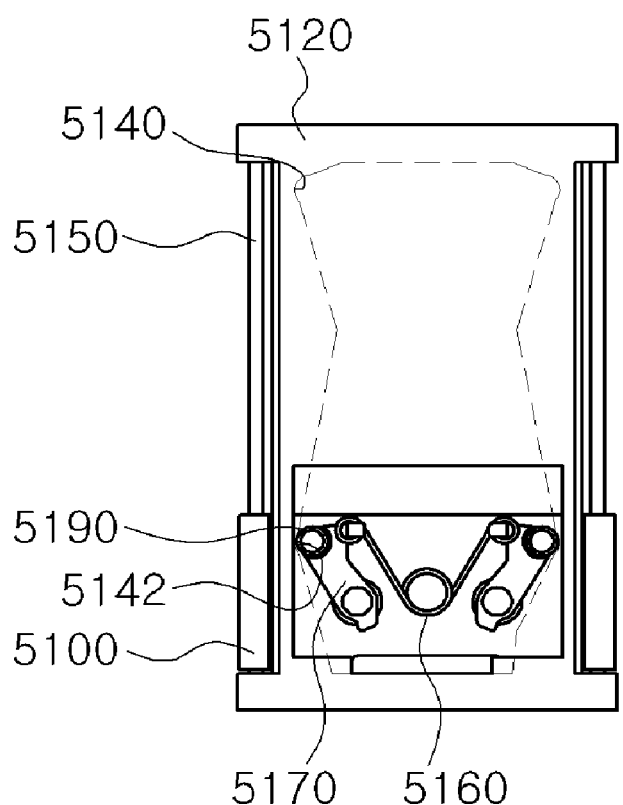

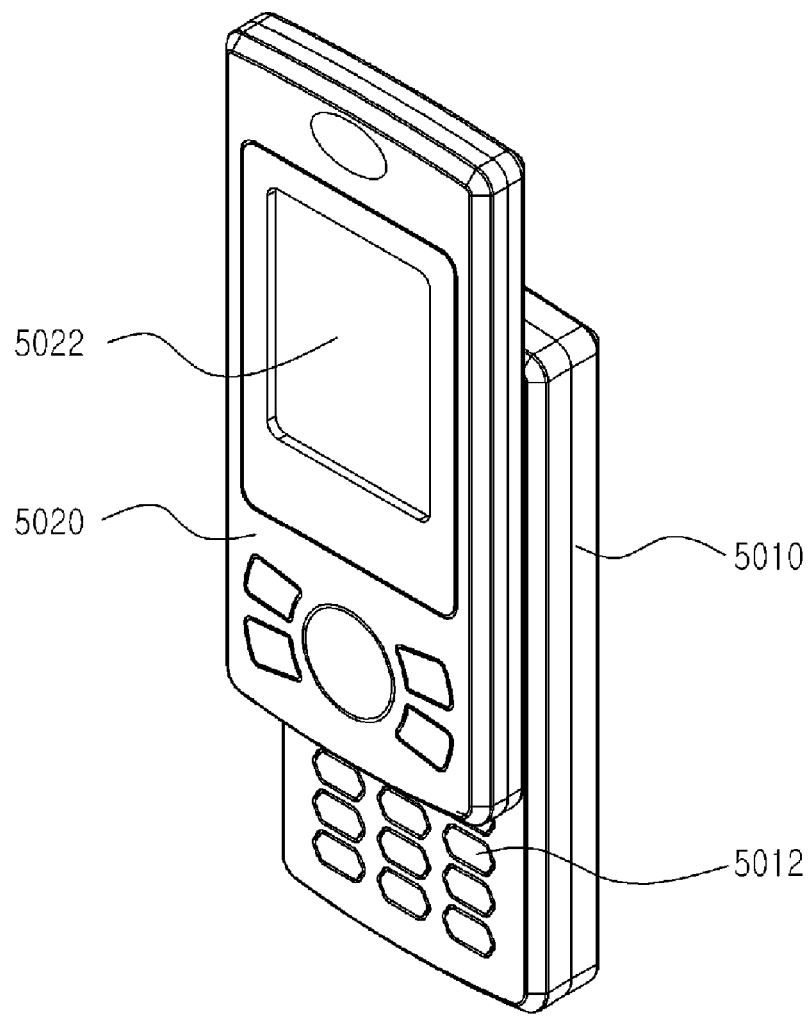
[Fig. 31]

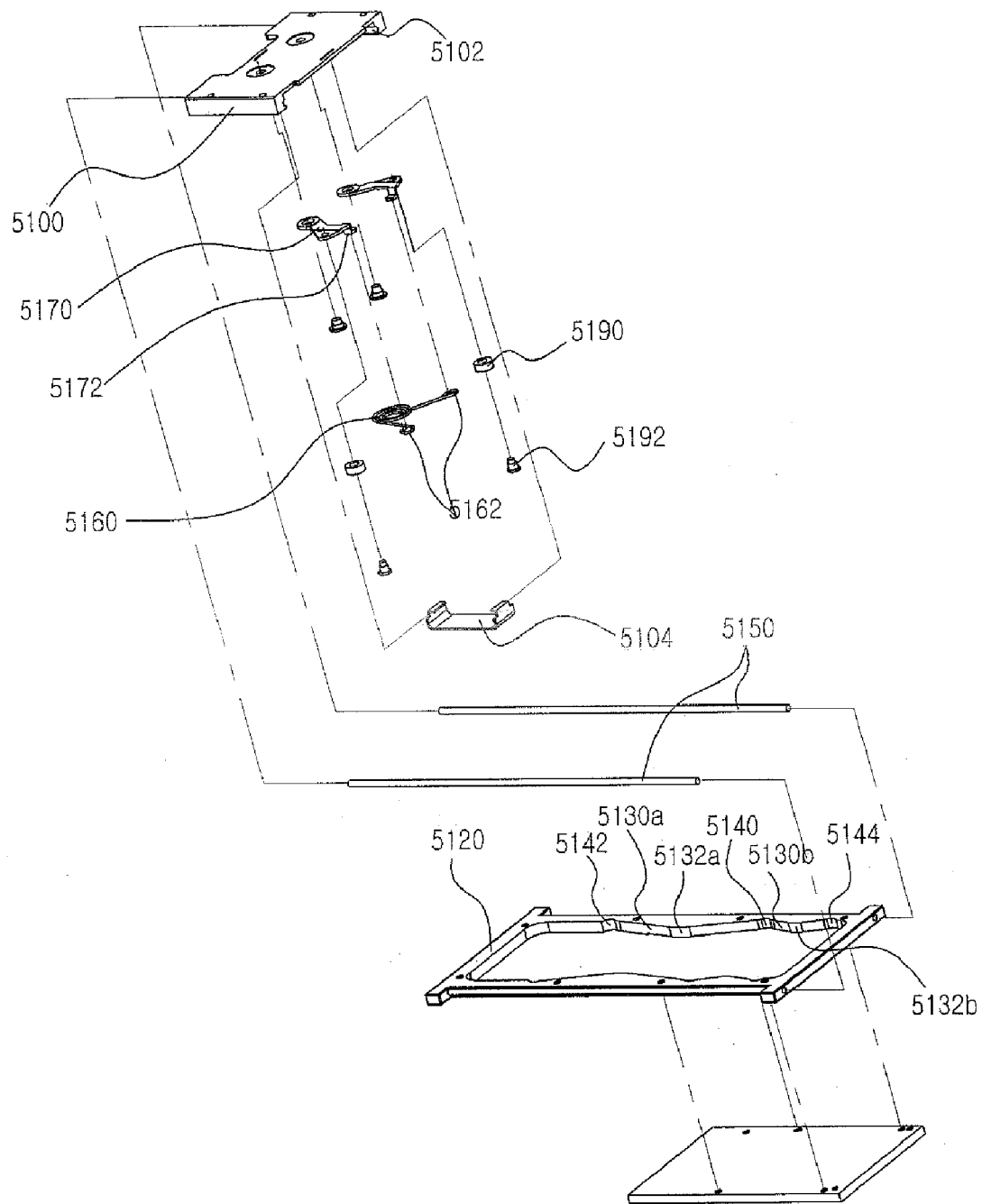
[Fig. 32]

[Fig. 33]
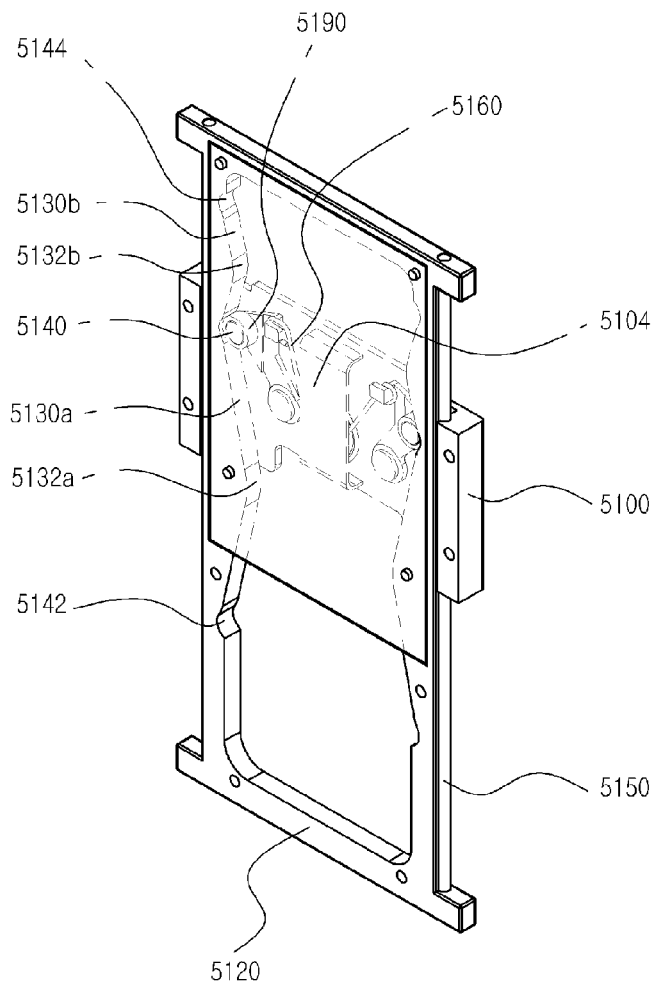
[Fig. 34]
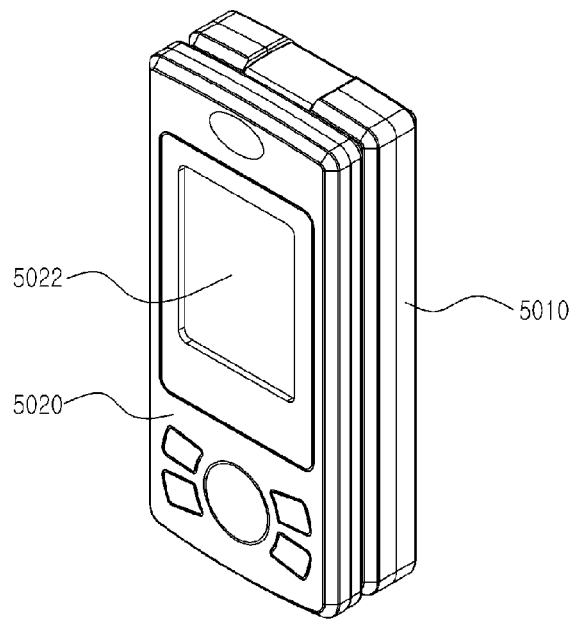

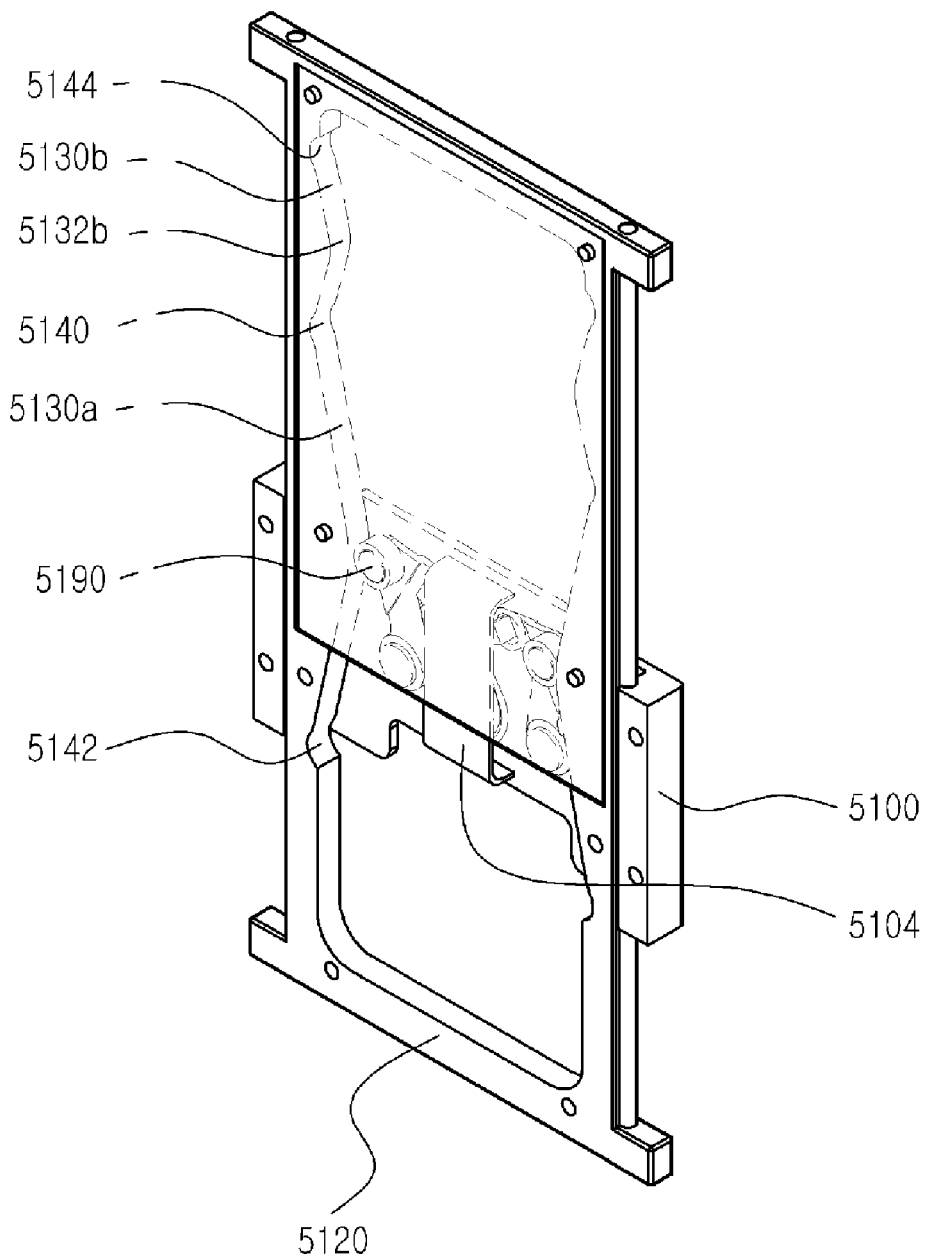
[Fig. 35]

[Fig. 36]
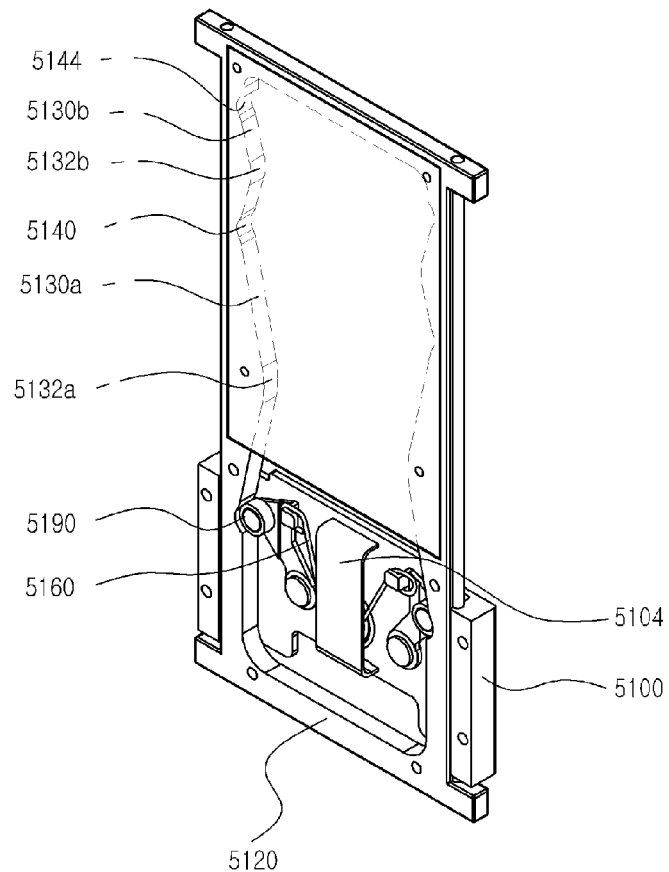
[Fig. 37]
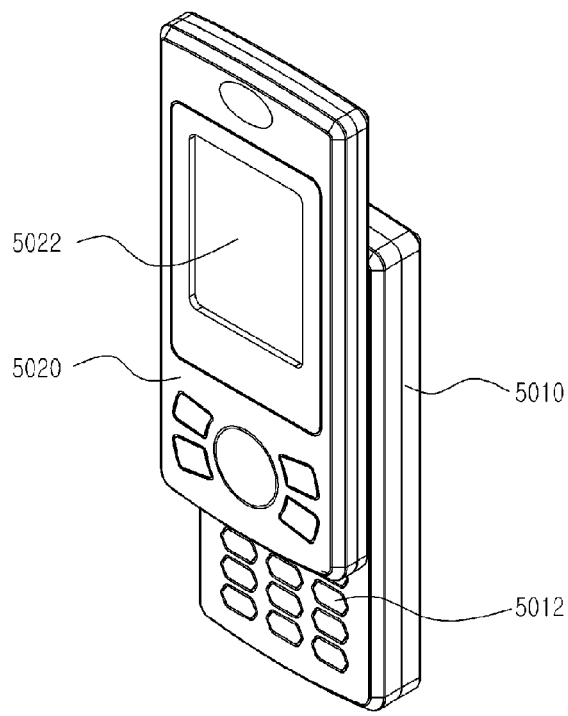

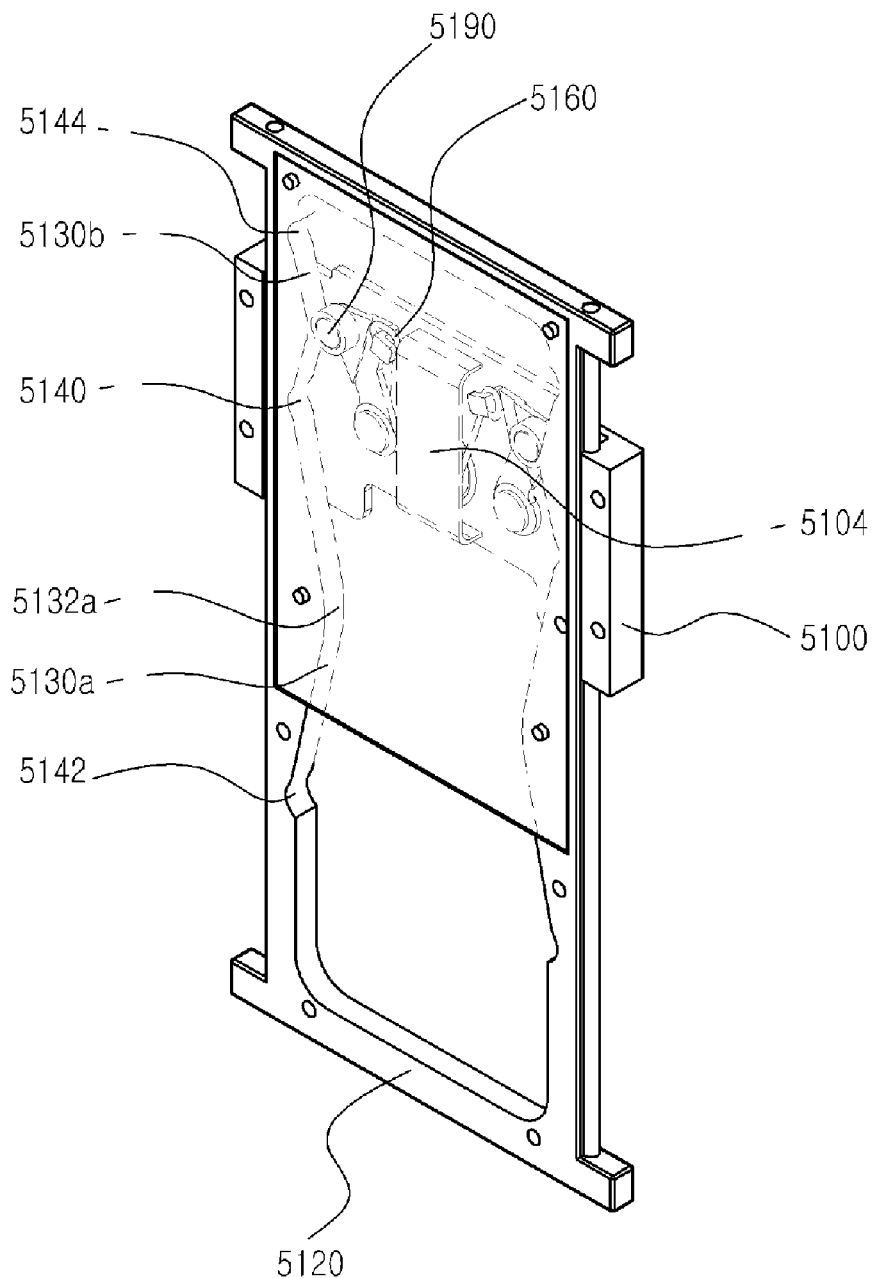
[Fig. 38]

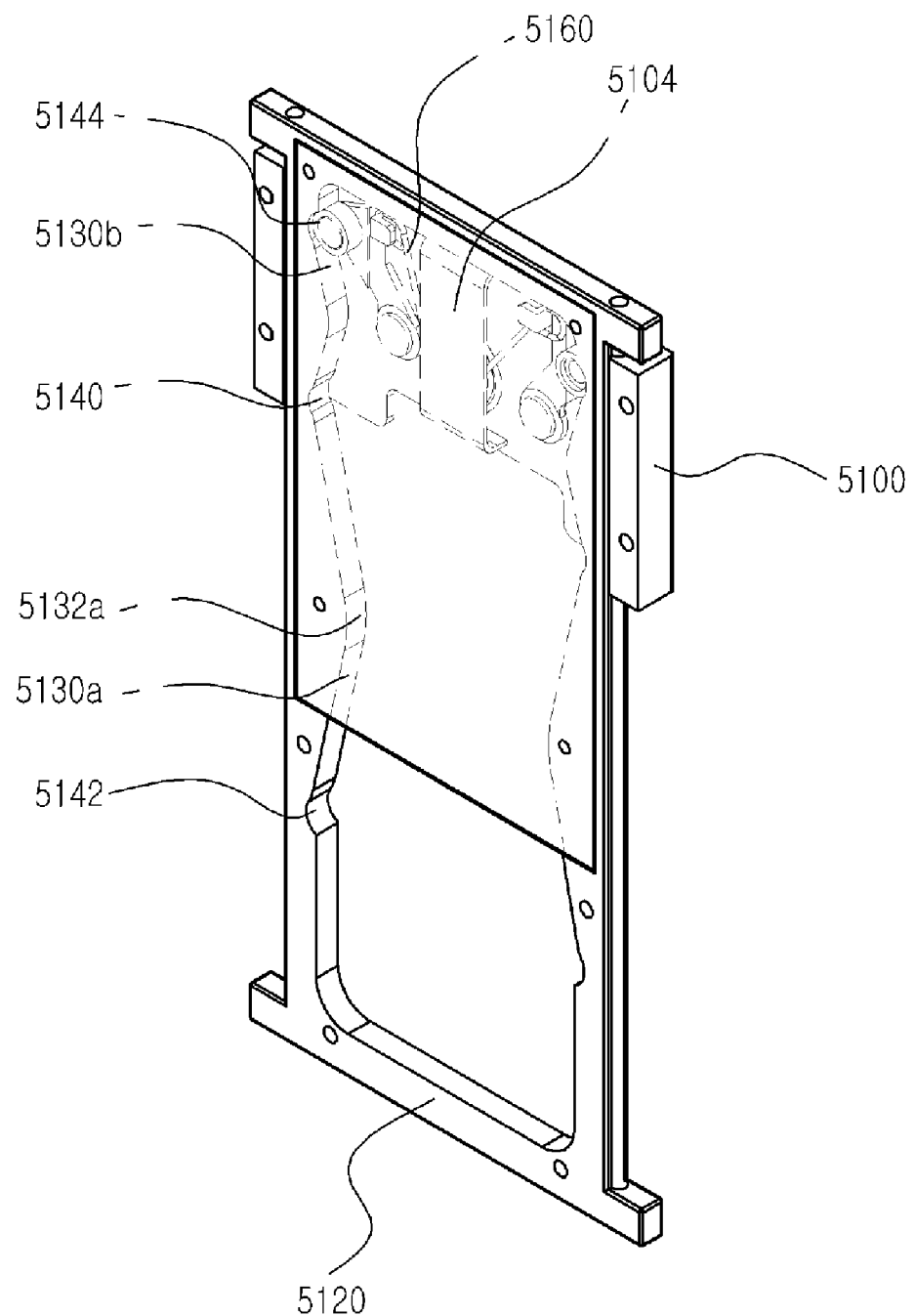
[Fig. 39]

[Fig. 40]
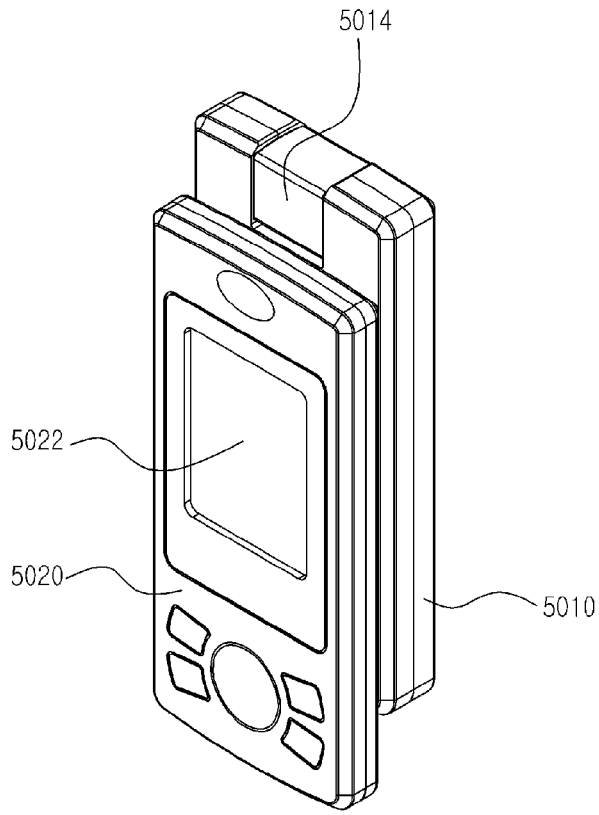
[Fig. 41]
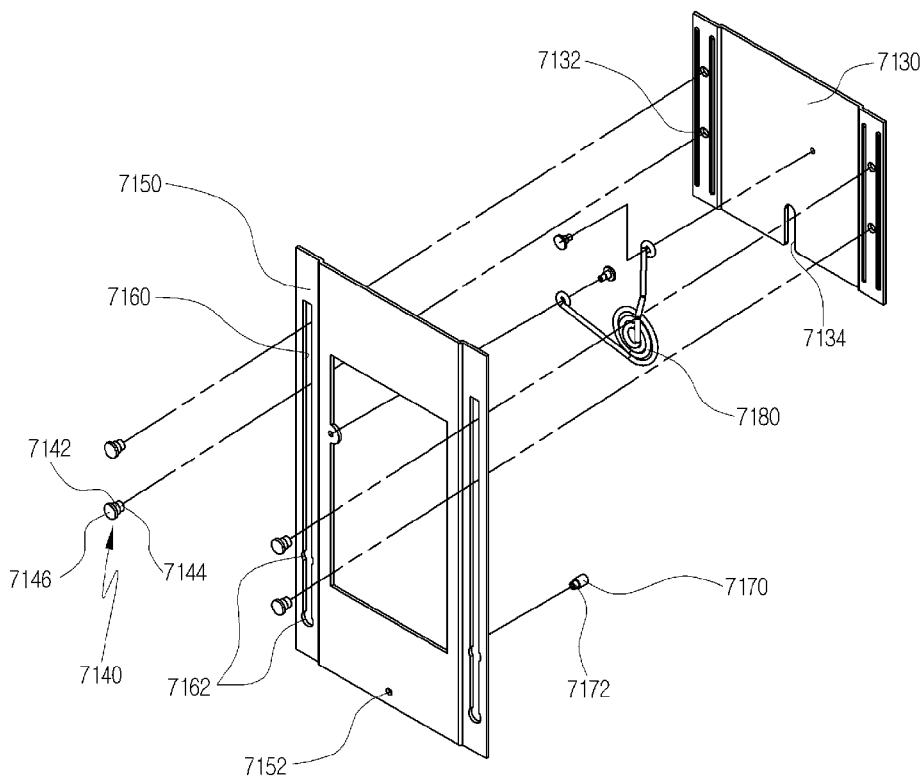

[Fig. 42]
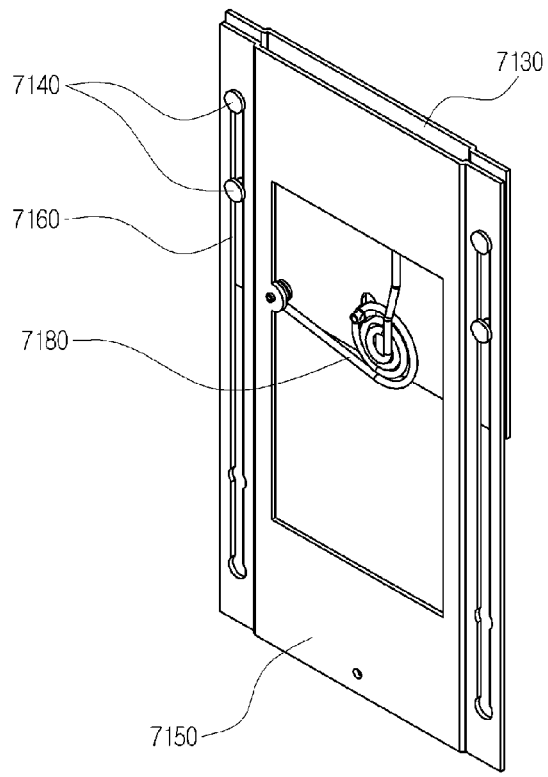
[Fig. 43]
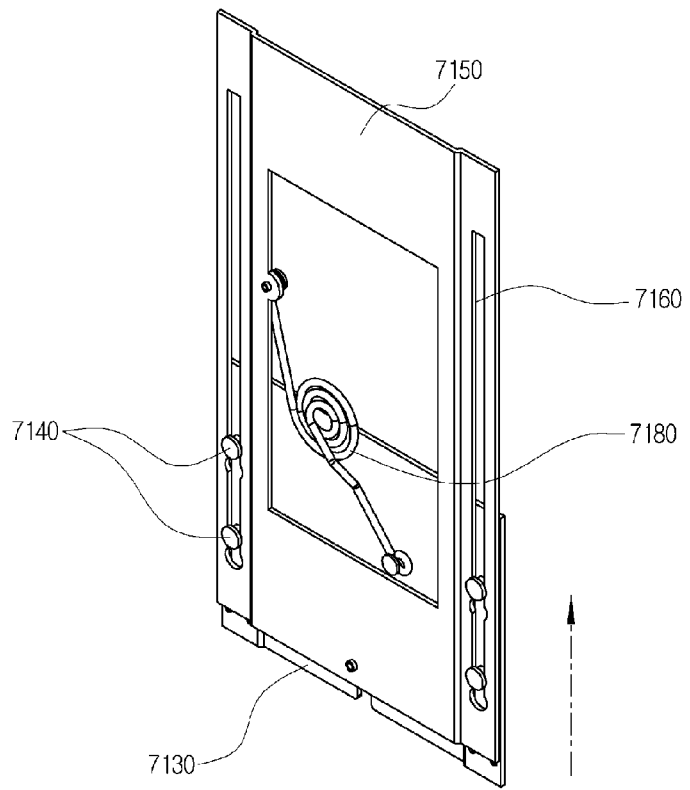

[Fig. 44]
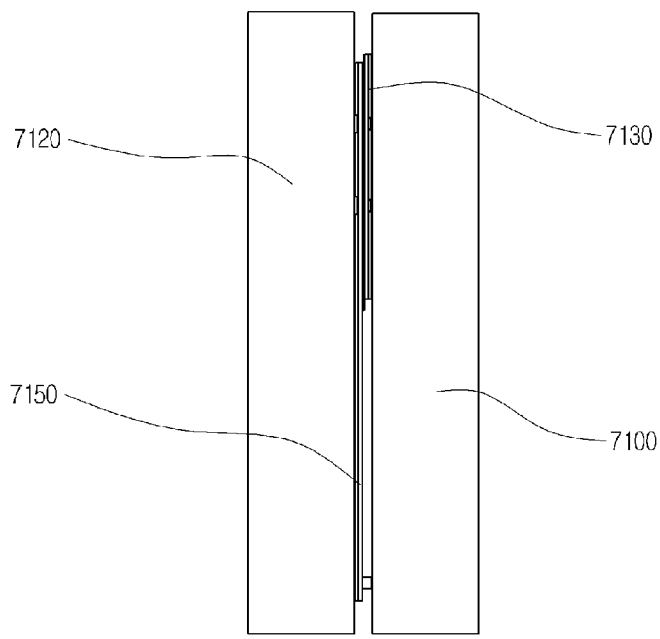
[Fig. 45]
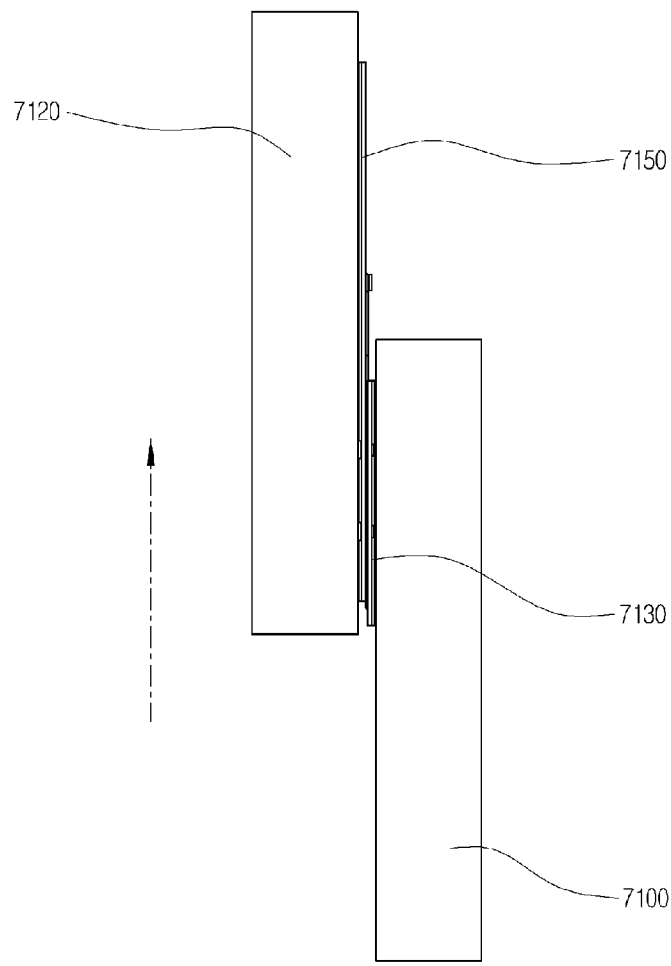

[Fig. 46]
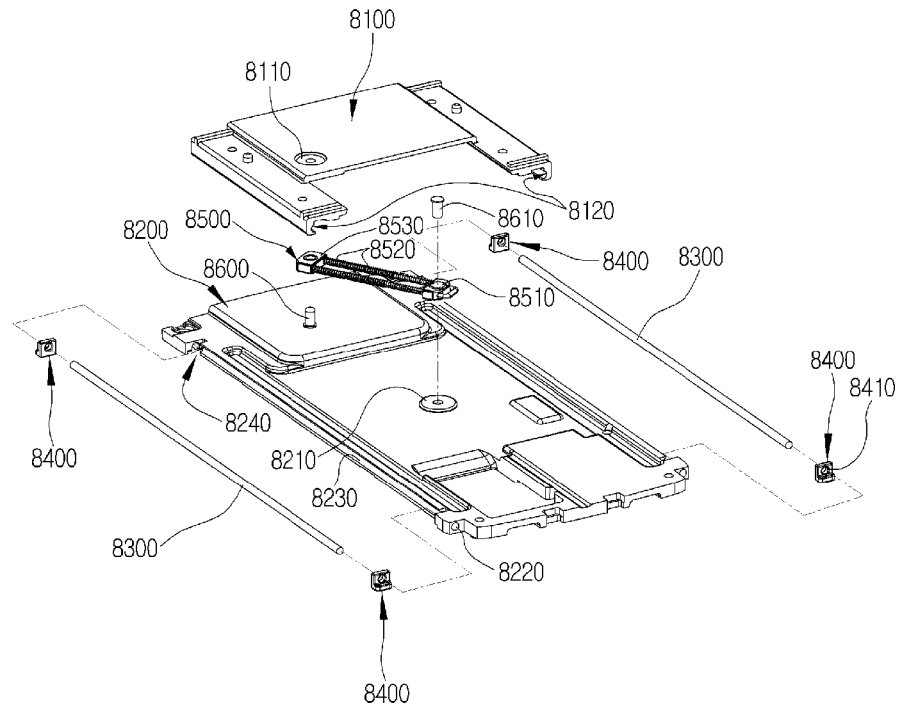
[Fig. 47]
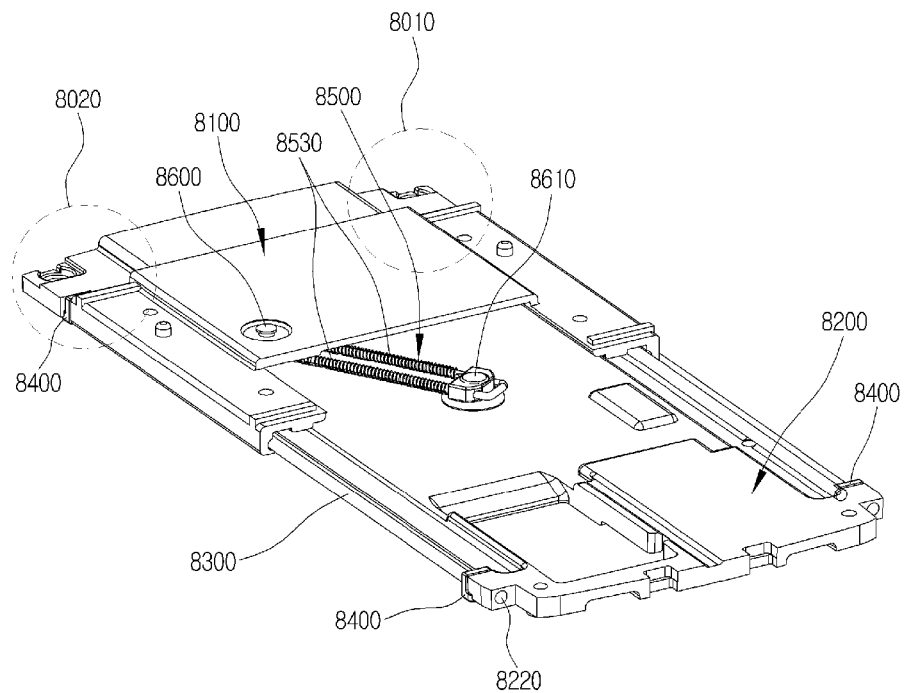

[Fig. 48]
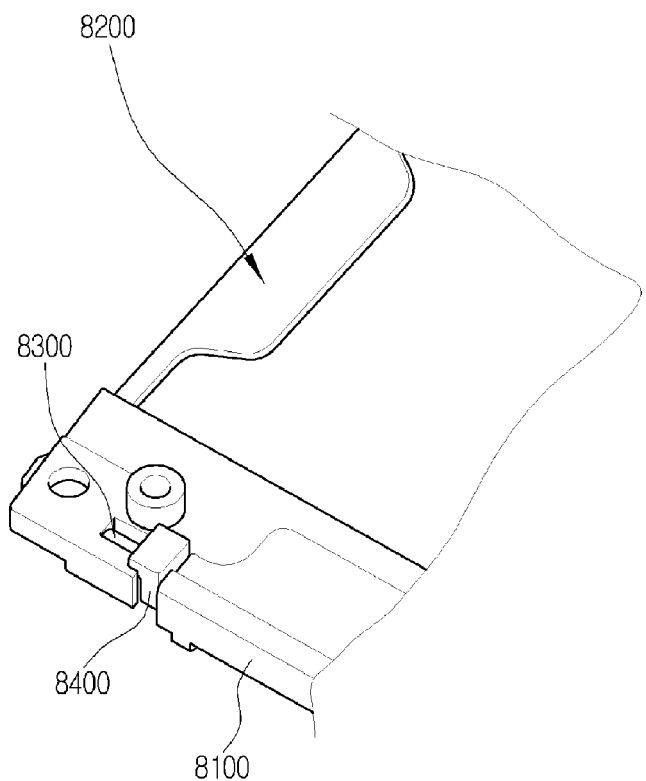
[Fig. 49]
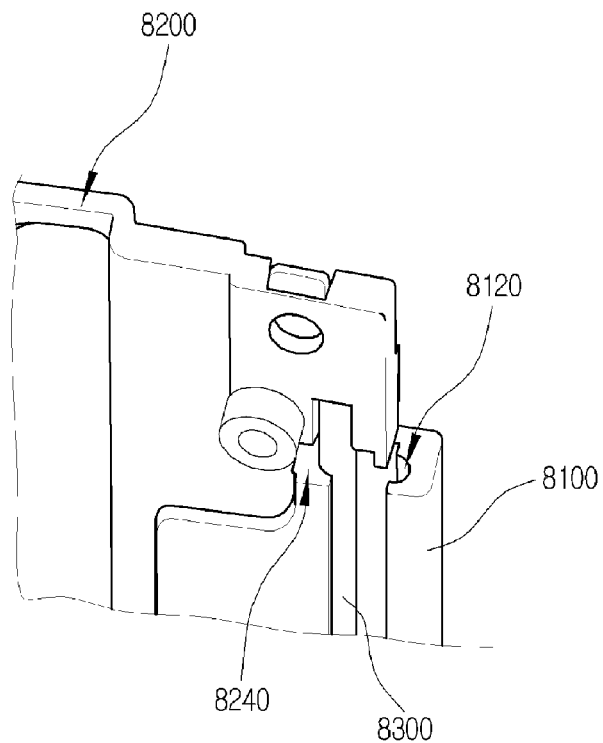

SLIDING MECHANISM FOR OPENING AND CLOSING OF CELLULAR PHONE

This patent application is a U.S. national stage filing under 35 U.S.C. §371 of International Application No. PCT/KR2005/03075 filed Sep. 15, 2005, which claims priority of Korean Application No. 10-2005-007785 filed Aug. 24, 2005, Korean Application No. 10-2005-0053445 filed Jun. 21, 2005, Korean Application No. 10-2005-0023528 filed Mar. 22, 2005, Korean Application No. 10-2005-0012594 filed Feb. 16, 2005, Korean Application No. 10-2005-0010549 filed Feb. 4, 2005, Korean Application No. 20-2005-0002869 filed Jan. 31, 2005, Korean Application No. 10-2004-0080462 filed Oct. 8, 2004, and Korean Application No. 10-2004-0073748 filed Sep. 15, 2004.

TECHNICAL FIELD

The present invention relates to a mechanism for slidably opening and closing a portable communication terminal. More specifically, the invention relates to a sliding mechanism for portable terminals, in which an initial exertion of force to a sub-body enables automatic opening and closing thereof in a slidable way, and the terminal remains in its opened or closed state by means of a resilient member.

BACKGROUND ART

Recently, as portable wireless terminals have been increasingly popularized, users need additional functions to their taste in opening and closing operation of a terminal, in addition to its inherent function of wireless communication.

In response to these needs, portable terminals have been developed into a bar type, flip type, flip-up type, folder type, and the like. Recently, the folder type has been used most widely.

This is because the folder type terminal has a space enough to adopt an LCD module as the display device and can be held in a folded state to thereby provide a good portability, as compared with other type terminals.

On the other hand, a slider type terminal has been introduced, which can be equipped with an LCD module display device having a similar size to the folder type. Simultaneously, the slider type can contribute to miniaturization of portable terminals.

This slider type terminal is structured such that a sub-body corresponding to a cover is slidably opened and closed on a main body, thereby providing additional advantages of slidably opening and closing, while maintaining advantages of the existing folder type terminal.

For example, Korean Utility Model Application No. 2003-0000136 discloses a slider-type portable wireless terminal.

The terminal disclosed in the above application a guide means for guiding a sub-body on a main body and at least one resilient means installed between the sub-body and the main body such that its resilient force can be exerted in opening or closing direction with respect to a certain sliding point of the sub-body. In addition, when the sub-body is completely opened and closed, it can remain in its opened or closed state due to the resilient means, without any separate stopper. The resilient means employs a torsion spring, one end of which is fixed to the main body and the other end thereof is fixed to the sub-body.

In this terminal, one end of the torsion spring is fixed to the main body and the other end thereof is fixed to the sub-body, and thus the resiliency of the torsion spring is exerted over the whole moving distance of the sub-body. Thus, the torsion spring is compressed and stretched over a wide length. Therefore, the torsion spring employs one expandable over a wide length, but having a smaller resilient force. In order to compensate for the deficient resilient force, two torsion springs are employed.

Accordingly, in the above-described conventional opening and closing apparatus, the torsion is deformed in a wide range and easily degraded due to fatigue caused by repeated operations. Thus, the torsion spring comes to lose its normal function within a shorter period of time.

In addition, as a guide means for guiding the sub-body on the main body, the above conventional opening and closing apparatus is provided with a guide slit formed lengthwise in both lateral sides of the main plate. The slider plate includes a guide rib to be slidably coupled to the guide slit.

In the above terminal, the guide rib slides along the guide slit, and thus the slider plate and the sub-body is configured to be opened from the main plate and the main body.

In the conventional opening and closing apparatus, however, the guide slit is formed in the main plate and the guide rib is formed in the slider plate. Thus, it leads to an increase in the thickness of the opening and closing apparatus, thereby providing a difficulty in making a slim terminal.

Furthermore, with the above conventional apparatus, a difficulty occurs in assembling the guide rib and the guide slit, due to clearance in component specifications. The repeated sliding motion of the slider plate on the main plate generates vibration, which may causes damage on components housed in a terminal. The sliding portion is abraded or clearance in assembled components occurs, thereby causing problems in smooth sliding of the slider plate.

DISCLOSURE OF INVENTION

Technical Problem

Accordingly, the present invention has been made in order to solve the above problems in the prior art. It is an object of the invention to provide a mechanism for slidably opening and closing a portable communication, in which the resilient member is formed of a compression spring having a good resiliency and extended service life, thereby extending the service life of the mechanism and thus improving its reliability.

Other object of the invention is to provide an improved structure for slidably coupling a main plate and a slider plate to each other, thereby minimizing the entire thickness of a portable terminal.

Another object of the invention is to improve a sliding mechanism of a portable terminal to reduce clearance among their components, thereby enabling a smooth sliding movement.

Technical Solution

In order to accomplish the above objects, according to one aspect of the invention, there is provided a mechanism for slidably opening and closing a portable communication terminal. The mechanism comprises: a main plate; a slider plate slidably connected to the main plate; a first block shaft-rotatably fixed to the main plate; one or more first rod members fixed to the first block; a first resilient member connected to the first rod member and generating an expansion force; a second block shaft-rotatably fixed to the slider plate; one or more second rod members fixed to the second block; a second resilient member connected to the second rod member and generating an expansion force; and a connection block placed between the first block and the second block and slidably connected with the first rod member and the second member in such a way that the end portion of the first rod member is directed towards the second block and the end portion of the second rod member is directed towards the first block, the connection block supporting the end portions of the first and second resilient members.

According another aspect of the invention, there is provided a mechanism for slidably opening and closing a portable communication terminal. The mechanism comprises: a main plate; a slider plate slidably connected to the main plate; a first block shaft-rotatably fixed to the main plate; one or more first rod members fixed to the first block; a first resilient member connected to the first rod member and generating an expansion force; a second block shaft-rotatably fixed to the slider plate; one or more second rod members fixed to the second block; a second resilient member connected to the second rod member and generating an expansion force; and a connection block placed between the first block and the second block, the connection block having a first slide hole formed for the first rod member to be slidably combined therewith and a second slide hole formed at a position spaced apart from the first slide hole in perpendicular direction to the axis of the first rod member such that the second rod member is slidably combined therewith, the connection block supporting the end portions of the first and second resilient members.

According to another aspect of the invention, there is provided a mechanism for slidably opening and closing a portable communication terminal, which includes a first body and a second body slidably opening and closing the first body. The mechanism comprises: a first plate partially coupled to the first body; a second plate coupled to the rear face of the second body and slidably coupled to the first plate; a pair of compression springs disposed between the first plate and the second plate, which are thereby resiliently connected to each other; and a U-shaped link member inserted inside the compression spring so as to guide the compression spring linearly and rotatably between the first plate and the second plate, the link member being opened at its one end, wherein, at the instant when the second plate passes beyond a transition point, the second plate is accelerated along the first plate in the advancing direction thereof by means of the resilient force of the compression spring.

According to another aspect of the invention, there is provided a mechanism for slidably opening and closing a portable communication terminal, which includes a main body and a slider body capable of slidably operating with respect to the main body. The mechanism comprises: a fixing plate coupled to the main body; a slider plate coupled to the slider body in such a way as to slide with respect to the fixing plate; a first resilient member, one end of which is supported at the fixing plate and the other end of which is supported at the slider plate; and a second resilient member, one end of which is supported at the fixing plate and the other end of which is supported at the slider plate, wherein the first resilient member and the second resilient member are formed of a zigzag spring, one ends of the first and second resilient members and the other ends of the first and second resilient members are placed in different levels such that the first resilient member and the second resilient member are not overlapped with each other.

According to another aspect of the invention, there is provided a mechanism for slidably opening and closing a portable communication terminal. The mechanism comprises: a first plate; a second plate connected so as to be slid in one direction from the first plate and having one or more inclined faces, a transition point being provided at the central area of the inclined face whose inclination direction is reversed at the transition point; a resilient means for generating a resilient force in a direction perpendicular to moving direction of the second plate; a connection member for fixing the resilient means onto the first plate; and one or more slip members for receiving the resilient force of the resilient means and transferring the resilient force to the inclined face such that the second plate can be slid from the first plate.

According to another aspect of the invention, there is provided a mechanism for slidably opening and closing a portable communication terminal. The mechanism comprises a main plate combined with a main body and a slider plate combined with a sub-body and slidably combined with the main plate, wherein the slider plate is provided with a slide groove formed in moving direction of the slider plate, and the main plate is provided with a guide pin fixed thereto to be slidably combined to the slide groove such that the slider plate is slidably connected with the main plate.

According to another aspect of the invention, there is provided a mechanism for slidably opening and closing a portable communication terminal, which the mechanism comprising a first body and a second body slidably moving in one direction from the first body. The mechanism comprises: a first plate fixed to the first body; a guide rod fixed to one or more position of the first plate; a second plate fixed to the second body so as to be slidably moved on the guide rod; and a damper for absorbing impact generated while the second plate slides and buffering the guide rod from vibrating in various directions.

Advantageous Effects

As described above, the present invention provides a mechanism for slidably opening and closing a portable communication, in which the resilient member is formed of a compression spring having a good resiliency and extended service life, thereby extending the service life of the mechanism and thus improving its reliability.

In addition, according to the present invention, a guide pin is used to slidably couple a main plate and a slider plate to each other, thereby minimizing the entire thickness of a portable terminal.

Furthermore, according to the present invention, a multi-direction buffering means is combined in the sliding component of the sliding mechanism of a portable terminal, thereby reducing adverse effects of the sliding operation and thus enabling a smooth sliding movement.

BRIEF DESCRIPTION OF THE DRAWINGS

Further objects and advantages of the invention can be more fully understood from the following detailed description taken in conjunction with the accompanying drawings in which:

FIG. 1 is an exploded perspective view of a portable communication terminal according to a first embodiment of the invention;

FIG. 2 is a transversal cross-section of a mechanism for slidably opening and closing the portable communication terminal of FIG. 1;

FIG. 3 is a vertical cross-section of FIG. 2;

FIG. 4 is a transversal cross-section showing an intermediate state of opening the mechanism of FIG. 2.

FIG. 5 is a transversal cross-section showing the open state of the mechanism of FIG. 2;

FIG. 6 is a vertical cross-section of FIG. 5;

FIG. 7 is an exploded perspective view of a portable communication terminal according to a second embodiment of the invention;

FIG. 8 is a transversal cross-section of a sliding mechanism for opening and closing the terminal of FIG. 7;

FIG. 9 is a vertical cross-section of FIG. 8;

FIG. 10 is a transversal cross-section showing an intermediate state of opening the mechanism of FIG. 8.

FIG. 11 is a transversal cross-section showing the open state of the mechanism of FIG. 8;

FIG. 12 is a vertical cross-section of FIG. 11;

FIG. 13 is an exploded perspective view of a mechanism for slidably opening and closing a communication terminal according to a third embodiment of the invention;

FIG. 14 shows an assembled state of the sliding mechanism of FIG. 13;

FIG. 15 schematically shows a closed state of the sliding mechanism of FIG. 13.

FIG. 16 schematically shows a partially opened state of the sliding mechanism of FIG. 13;

FIG. 17 schematically shows a completely opened state of the sliding mechanism of FIG. 13;

FIG. 18 is an exploded perspective view of a mechanism for slidably opening and closing a communication terminal according to a fourth embodiment of the invention;

FIG. 19 is a perspective view of the sliding mechanism where the portable terminal is completely closed;

FIG. 20 is an elevational view of the sliding mechanism of FIG. 19;

FIG. 21 is a side view of the sliding mechanism of FIG. 19;

FIG. 22 is a perspective view of the sliding mechanism where the portable terminal is completely opened;

FIG. 23 is an elevational view of the sliding mechanism of FIG. 22;

FIG. 24 is a side view of the sliding mechanism of FIG. 22;

FIG. 25 is an exploded perspective view of a mechanism for slidably opening and closing a communication terminal according to a fifth embodiment of the invention;

FIG. 26 shows an assembled state of the sliding mechanism of FIG. 25;

FIG. 27 is a plan view of the sliding mechanism of FIG. 26 where the second plate is closed;

FIG. 28 is a perspective view of a portable terminal equipped with the sliding mechanism according to the fifth embodiment of the invention where the terminal is closed;

FIG. 29 is a plan view of the second plate of FIG. 27 where the second plate moves in the opening direction thereof;

FIG. 30 is a plan view of the second plate of FIG. 28 where the second plate is moved to its opening position;

FIG. 31 is a perspective view of the portable terminal of FIG. 28 where the display is opened;

FIG. 32 is an exploded perspective view of a mechanism for slidably opening and closing a communication terminal according to a sixth embodiment of the invention;

FIG. 33 shows an assembled state of the sliding mechanism of FIG. 32;

FIG. 34 is a perspective view of a portable terminal equipped with the sliding mechanism according to the sixth embodiment of the invention where the terminal is closed;

FIG. 35 is a perspective view of the second plate of FIG. 33 where the second plate is being moved to the opening position of a keypad;

FIG. 36 is a perspective view of the second plate of FIG. 35 where the second plate is opened in the opening position of the keypad;

FIG. 37 is a perspective view of the portable terminal of FIG. 34 where the display is opened in the opening direction of the keypad;

FIG. 38 is a perspective view of the second plate of FIG. 33 where the second plate is being moved in the opening direction of a camera;

FIG. 39 is a perspective view of the second plate of FIG. 38 where the second plate is opened in the opening direction of the camera;

FIG. 40 is a perspective view of the portable terminal of FIG. 34 where the display is opened in the opening direction of the camera;

FIG. 41 is an exploded perspective view of a mechanism for slidably opening and closing a communication terminal according to a seventh embodiment of the invention;

FIG. 42 is a perspective view showing an assembled state of the sliding mechanism of FIG. 41;

FIG. 43 is a perspective view showing an opened state of the sliding mechanism of FIG. 42;

FIG. 44 is a schematic vertical cross-section of a portable terminal to which the sliding mechanism of FIG. 42 is applied;

FIG. 45 is a schematic vertical cross-section of the portable terminal of FIG. 44 where the second body is opened;

FIG. 46 is an exploded perspective view of a mechanism for slidably opening and closing a communication terminal according to an eighth seventh embodiment of the invention;

FIG. 47 is a perspective view showing an assembled state of the sliding mechanism of FIG. 46;

FIG. 48 is an enlarged perspective view showing part of the rear side of the sliding mechanism of FIG. 47; and FIG. 49 is an enlarged perspective view partially showing another part of the rear side of the sliding mechanism of FIG. 47.

BEST MODE FOR CARRYING OUT THE
INVENTION

The preferred embodiments of the present invention will be hereafter described in detail with reference to the accompanying drawings.

FIG. 1 is an exploded perspective view of a portable communication terminal according to a first embodiment of the invention. FIG. 2 is a transversal cross-section of a mechanism for slidably opening and closing the portable communication terminal of FIG. 1 and FIG. 3 shows a vertical cross-section of FIG. 2.

The portable communication terminal includes a main body 1100 and a sub-body 1120. A keypad is mounted on the surface of the main body, inside of which a main board performing various functions is housed. A liquid crystal display window is installed in the sub-body 1120. The sub-body 1120 and the main body 1100 are electrically connected to each other through a flexible printed circuit board.

The sliding mechanism for opening and closing the sub-body 1120 and the main body 1100 relative to each other includes a main plate 1130 fixed to the main body 1100, a slider plate 1150 fixed to the sub-body 1120 and slidably coupled to the main plate 1130, a first block shaft-rotatably fixed to the main plate 1130, one or more first rod member 1170 fixed to the first block, a first resilient member 1172 coupled to the first rod member 1170 and generating an expansion force, a second block 1180 shaft-rotatably fixed to the slider plate 1150, one or more second rod member 1190 fixed to the second block 1180, a second resilient member 1200 coupled to the second rod member 1190 and generating an expansion force, and a connection block 1210 placed between the first block 1160 and the second block 1180 and connected with the first and second rod members in such a manner that the end portion of the first rod member 1170 is directed towards the second block 1180 and the end portion of the second rod member 1190 is directed towards the first block 1160. The connection block 1210 supports the end portions of the first resilient member 1172 and the second resilient member 1200 respectively.

The expansion force of the first resilient member 1172 and the second resilient member 1200 is exerted on the first block 1160 and the second block 1180. The first block 1160 and the second block 1180 is installed at a position in such a way that, at a certain point while the slider plate 1150 travels, the slider plate 1150 is resiliently biased in the closing direction when being closed, or in the opening direction when being opened.

One or more guide shaft 1152 is connected to the slider plate 1150. The main plate 1130 is provided with a guide hole 1132 formed to be slidably coupled with the guide shaft 1152 to thereby guide the traveling path of the slider plate 1150.

A first rotation hole 1162 is formed in the first block 1160, which is rotatably connected to the main plate 1130 by means of the first rotation hole 1160 and a first rotation shaft 1164 to be inserted therein. In addition, the second block 1180 is provided with a second rotation hole 1182, and rotatably connected to the slider plate 1150 by means of the second rotation hole and a second rotation shaft 1184 coupled thereto.

In addition, the connection block 1210 is provided with a first slide hole 1212 and a second slide hole 1214 formed for the first rod member 1170 and the second rod member 1190 to be slidably coupled thereto respectively.

On the other hand, the first and second resilient members 1172 and 1200 are formed of a compression spring.

The moving distance of the slider plate 1150 in the opening direction is configured to be shorter than that of closing direction.

Thus, when the sub-body 1120 is opened, the pushing distance of the sub-body 1120 is shorter than when it is closed, so that the sub-body 1120 can be easily opened.

Hereinafter, the operation of the first embodiment will be explained.

First, when the communication terminal is closed, as shown in FIGS. 2 and 3, the sub-body 1120 having an LCD window installed therein is overlapped with the main body 1100 to close it. At this time, the slider plate 1150 coupled to the sub-body 1120 remains at closed state, due to the pushing force of the second block 1180 caused by the resilience of the second resilient member 1200.

At this state, when the sub-body 1120 is pushed by a hand in order to open the communication terminal, the sub-body 1120 slides together with the slider plate 1150. At this time, the guide hole formed in the main-body 1100 guides the guide shaft 1152 of the slider plate 1150 such that the slider plate 1150 can perform a linear motion properly.

In this way, while the slider plate 1150 is opened as shown in FIG. 4, the slider plate 1150 pushes the second block 1180, which then compresses the second resilient member 1200 and rotates. In addition, the second rod member 1190 is partially moved towards the first block 1160 through the second slide hole 1214 formed in the connection block 1210 to reduce the rotation radius of the second rod member 1190 and thus enable the sliding motion of the slider plate 1150. Furthermore, during this course of action, the second resilient member 1200 pushes the connection block 1210 towards the first block 1160. Thus, the first resilient member 1172 is compressed such that the first rod member 1170 is partially moved towards the second block 1180 through the first slide hole 1212 of the connection block 1210.

In order to open the sub-body 1120, a force must be exerted to push the sub-body 1120 at the initial state. However, after passing a transition point where the first and second blocks are closest to each other, the slider plate 1150 is biased in the opening direction due to the resiliency of the first and second resilient members 1172 and 1200. Thus, from this point on, the slider plate 1150 is automatically moved to the open state, without exerting any force to the slider plate 1150.

FIG. 5 is a transversal cross-section showing the open state of the sliding mechanism of the invention, and FIG. 6 is a vertical cross-section of FIG. 5.

If the sub-body is completely opened, the slider plate 1150 remains at the opened state, due to the pushing force of the second block 1180 caused by the first and second resilient members 1172 and 1200.

If the sub-body 1120 is opened, the LCD window opens the keypad of the main body 1100, so that a user can use the inherent functions of the communication terminal.

On the other hand, in order to close the sub-body from the opened state, the user pushes the sub-body 1120 in opposite direction to when being opened. The closing operation is performed in the opposite orders of the opening thereof.

Hereafter, a second embodiment of the invention will be explained.

FIG. 7 is an exploded perspective view of a portable communication terminal according to a second embodiment of the invention. FIG. 8 is a transversal cross-section of a sliding mechanism for opening and closing the terminal of FIG. 7. FIG. 9 is a vertical cross-section of FIG. 8.

The portable communication terminal according to the second embodiment includes a main body 2100 and a sub-body 1120. A keypad is mounted on the surface of the main body, inside of which a main board performing various functions is housed. A liquid crystal display window 2122 is installed in the sub-body 2120. The sub-body 2120 and the main body 2100 are electrically connected to each other through a flexible printed circuit board.

The sliding mechanism for opening and closing the sub-body 2120 and the main body 2100 relative to each other includes a main plate 2130 fixed to the main body 2100, a slider plate 2150 fixed to the sub-body 2120 and slidably coupled to the main plate 2130, a first block shaft-rotatably fixed to the main plate 2130, one or more first rod member 2170 fixed to the first block, a first resilient member 2172 coupled to the first rod member 2170 and generating an expansion force, a second block 2180 shaft-rotatably fixed to the slider plate 2150, one or more second rod member 2190 fixed to the second block 2180, a second resilient member 2200 coupled to the second rod member 2190 and generating an expansion force, and a connection block 2210 placed between the first block 2160 and the second block 2180. The connection block 2210 is provided with a first slide hole 2212 formed for the first rod member 2170 to be slidably inserted, and a second slide hole 2214 formed for the second rod member 2190 to be slidably inserted. The second slide hole 2214 is formed at a position spaced apart from the first slide hole 2212 in a direction perpendicular to the axis of the first rod member 2170. The connection block 2210 supports the end portions of the first resilient member 2172 and the second resilient member 2200 respectively.

The expansion force of the first resilient member 2172 and the second resilient member 2200 is exerted on the first block 2160 and the second block 2180. The first block 2160 and the second block 2180 is installed at a position in such a way that, at a certain point while the slider plate 2150 travels, the slider plate 2150 is resiliently biased in the closing direction when being closed, or in the opening direction when being opened.

The first rod member 2170 is formed in a pair and the first slide hole 2212 is also formed in a pair. The pair of first rod members 2170 passes through the first slide holes 2212 and then is connected to each other to form a U-shape.

Similarly, the second rod member 2190 is formed in a pair and the second slide hole 2214 is also formed in a pair. The pair of second rod members 2190 passes through the second slide holes 2214 and then is connected to each other to form a U-shape.

As described above, the first rod member 2170 and the second rod member 2190 have a U-shape, thus preventing the first and second rod members from being escaped from the connection block 2210.

One or more guide shaft 2152 is connected to the slider plate 2150. The main plate 2130 is provided with a guide hole 2132 formed to be slidably coupled with the guide shaft 2152 to thereby guide the traveling path of the slider plate 2150.

A first rotation hole 2162 is formed in the first block 2160, which is rotatably connected to the main plate 2130 by means of the first rotation hole 2160 and a first rotation shaft 2164 to be inserted therein. In addition, the second block 2180 is provided with a second rotation hole 2182, and rotatably connected to the slider plate 2150 by means of the second rotation hole 2182 and a second rotation shaft 2184 coupled thereto.

In addition, the connection block 2210 is provided with a first slide hole 2212 and a second slide hole 2214 formed for the first rod member 2170 and the second rod member 2190 to be slidably coupled thereto respectively.

On the other hand, the first and second resilient members 2172 and 2200 are formed of a compression spring.

The moving distance of the slider plate 2150 in the opening direction is configured to be shorter than that of closing direction.

Thus, when the sub-body 2120 is opened, the pushing distance of the sub-body 2120 is shorter than when it is closed, so that the sub-body 2120 can be easily opened.

Hereinafter, the operation of this embodiment will be explained.

First, when the communication terminal is closed, as shown in FIGS. 8 and 9, the sub-body 2120 having an LCD window 2122 installed therein is overlapped with the main body 2100 to close it. At this time, the slider plate 2150 coupled to the sub-body 2120 remains at closed state, due to the pushing force of the second block 2180 caused by the resilience of the second resilient member 2200.

At this state, when the sub-body 2120 is pushed by a hand in order to open the communication terminal, the sub-body 2120 slides together with the slider plate 2150. At this time, the guide hole formed in the main-body 2100 guides the guide shaft 2152 of the slider plate 2150 such that the slider plate 2150 can perform a linear motion smoothly.

In this way, while the slider plate 2150 is opened as shown in FIG. 10, the slider plate 2150 pushes the second block 2180, which then compresses the second resilient member 2200 and rotates. In addition, the second rod member 2190 is partially moved towards the first block 2160 through the second slide hole 2214 formed in the connection block 2210 to reduce the rotation radius of the second rod member 2190 and thus enable the sliding motion of the slider plate 2150. Furthermore, during this course of action, the second resilient member 2200 pushes the connection block 2210 towards the first block 2160. Thus, the first resilient member 2172 is compressed such that the first rod member 2170 is partially moved towards the second block 2180 through the first slide hole 2212 of the connection block 2210.

In order to open the sub-body 2120, a force must be exerted to push the sub-body 2120 at the initial state. However, after passing a transition point where the first and second blocks are closest to each other, the slider plate 2150 is biased in the opening direction due to the resiliency of the first and second resilient members 2172 and 2200. Thus, from this point on, the slider plate 2150 is automatically moved to the open state, without exerting any force to the slider plate 2150.

FIG. 11 is a transversal cross-section showing the open state of the sliding mechanism of the invention, and FIG. 12 is a vertical cross-section of FIG. 11.

If the sub-body 2120 is completely opened, the slider plate 2150 remains at the opened state, due to the pushing force of the second block 2180 caused by the first and second resilient members 2172 and 2200.

If the sub-body 2120 is opened, the LCD window opens the keypad of the main body 2100, so that a user can use the inherent functions of the communication terminal.

On the other hand, in order to close the sub-body 2120 from the opened state, the user pushes the sub-body 2120 in opposite direction to when being opened. The closing operation of the sub-body 2120 is performed in the opposite orders of the opening thereof.

Hereafter, a third embodiment of the invention will be explained in detail, referring to the accompanying drawings.

A first body constituting a portable communication terminal has a keypad mounted on the surface thereof, and houses a main board performing various functions thereinside. A second body has an LCD window installed thereon. The second body and the first body are electrically interconnected through a flexible printed circuit board.

FIG. 13 is an exploded perspective view of a mechanism for slidably opening and closing a communication terminal according to the third embodiment of the invention. FIG. 14 shows an assembled state of the sliding mechanism of FIG. 13.

Referring to FIGS. 13 and 14, a first plate 3110 is combined with the first body and a second plate 3120 is combined with the second body and slidably connected to the first plate 3110.

For this purpose, a guide shaft 3121 is fixed to the second plate 3120, and a guide hole 3111 is formed in both lateral end portions of the first plate 3110 in such a way that the guide shaft 3121 can be slidably connected thereto.

The guide shaft 3121 is inserted through both end portions of the second plate 3120 and a plurality of nuts 3122 is fixed to the end portions of the second plate 3120 such that the guide shaft 3121 is prevented from being escaped.

At this time, the guide shaft 3121 is inserted through one end of the second plate 3120 and then inserted halfway through the other end of the second plate 3120. The end portion in the second plate 3120 that the guide shaft 3121 is through-inserted can be bonded.

The first plate 3110 and the second plate 3120 are provided with a first through-hole 3112 and a second through-hole 3123 respectively formed in a desired position. The first plate 3110 and the second plate 3120 may be formed of a synthetic resin material such as plastic materials.

The first block 3130 has the form of a hollow rectangular block where one face thereof is completely opened and the other opposing face thereof is partially opened at its both end potions. The partially opened end portions of the first block 3130 may be inclined at certain desired degrees. In the other opposing faces of the first block 3130 is formed a third through-hole 3131 respectively identical to each other.

A first coupling pin 3140 is inserted into the third through-hole 3131 to rotatably fix the first block 3130 to the first plate 3110.

A link member 3150 formed of a U-shaped thin rod member is inserted into the partially opened both ends of the first block 3130 from the completely opened portion thereof to thereby be rotatably fixed by means of the first coupling pin 3140.

A compression spring 3160 is inserted into the rod portion of the link member 3150 through the opened end thereof. The compression spring 3160 is formed of a pair of coil springs, which have a diameter corresponding to the thickness of the link member 3150. The compression spring 3160 is compressed and tensioned, with the link member 3150 inserted thereinside. The link member 3150 and the compression spring 3160 may be combined into a modularized form, which can minimize deformation of the link member 3150 due to a possible impact to the link member 3150 and provide an improved durability to prevent from being inadvertently disassembled.

Similar to the first block 3130, the second block 3170 has the form of a hollow block where one face thereof is completely opened and the other opposing face thereof is partially opened at its both end potions. The partially opened end portions of the second block 3170 may be inclined at certain desired degrees. In the center of the other opposing faces of the second block 3170 is formed a fourth through-hole 3171 respectively identical to each other.

A second coupling pin 3180 is inserted into the fourth through-hole 3171 to thereby rotatably fix the second block 3170 to the second plate 3120.

The closed end portion of the link member 3150 is inserted into the partially opened end portion of the second block 3170, which thereby can be moved in the longitudinal direction of the link member 3150, while not escaping from the link member 3150. Therefore, the closed end of the link member 3150 limits the moving distance of the second block 3170 and the compression spring 3160, thereby serving as a stopper without necessity of providing a separate stopper.

FIGS. 15 to 17 show a closed state, a partially opened state and a completely opened state respectively of the sliding mechanism in FIG. 13.

Referring to FIGS. 15 to 17, the operation of the mechanism according to the third embodiment of the invention will be explained below.

The first plate 3110 is attached to the upper portion of the front face of the first body 3101 of the terminal, and the second plate 3120 is attached to over the entire rear face of the second body 3102. As shown FIG. 3, therefore, when the second body 3102 is closed by the first body 3101, the first plate 3110 is placed in the upper portion of the second plate 3120. The second body 3102, where the LCD window is installed, is overlapped with the first body 3101.

At this time, the closed end of the link member 3150 is placed in the center portion of the second plate 3120 and the opened end thereof is fixed onto the second plate 3120. Thus, the second block 3170 is biased due to the resiliency of the compression spring 3160, so that the second plate 3120 remains in its closed state.

The moving distance of the second block 3170 and the compression spring 3160 is restricted by the closed end portion 3151 of the link member 3150. Thus, the traveling of the second block 3170 and the compression spring 3160 can be stopped, without a separate stopper.

At this state, when the second body 3102 is pushed using a hang in order to open the communication terminal, the second body 3102 is slid up, together with the second plate 3120. At this time, since the guide shaft 3121 disposed at both ends of the second plate 3120 is combined with the guide hole 3111 formed in both ends of the first plate 3110, the second plate 3120 can perform a smooth linear motion on the first plate 3110.

If the second plate 3120 starts to open, the second plate 3120 pushes the second block 3170, which is rotatably fixed to the second plate 3120, and the second block 3170 movably connected to the link member 3150 performs a linear motion by means of the link member 3150, such that the first block 3130 and the second block 3170 become close to each other. Thus, the second block 3170 is moved inwardly on the link member 3150 such that the compression spring 3160 is compressed to increase its resilient force. Accordingly, this spring force acts as a force for obstructing the second plate 3120 and the second body 3102 from being opened.

When the second plate 3120 overcomes the obstructing force and continues to move to thereby be partially opened and pass the transition point of the compression spring 3160, as shown in FIG. 4, the spring force of the compression spring 3160 is exerted on the second block 3170 such that the second plate 3120 can ascend. Therefore, the second plate 3120 automatically ascends up until the opened state, without providing any additional force to the second body 3102 and the second plate 3120.

At this time, if the second block 3170 is placed precisely at the transition point and the second plate 3170 is pushed neither in the upper nor lower direction, the second plate 3120 is stopped due to the resiliency of the compression spring 3160, without moving in the upper or lower direction. Thus, the second plate 3120 can be stopped on the first plate 3110, without necessity of any separate stopper.

Preferably, the traveling distance of the second plate 3120 between the closed state and the transition point is shorter than that between the transition point and the opened state. Thus, due to this difference in the distances, the second plate 3120 can move from the closed state to the transition point even a weaker force, thereby enabling to more easily open the second plate 3120 and the second body 3120.

As shown in FIG. 17, once the second body 3102 is completely opened, the second plate 3120 remains in its opened state due to the pushing force of the second block 3170 caused by the resilient force of the compression spring 3160. At this time, the closed end portion of the link member 3150 restricts the moving distance of the second block 3170 and the compression spring 316, which thereby can be stopped without any separate stopper.

When the second body 3102 is opened, the keypad mounted in the first body 3101 is exposed such that a user can use inherent functions of the communication terminals.

On the other hand, in order to close the terminal from the opened state, a user pushes the second body 3102 in the opposite direction to the opening operating, using his or her hand. The closing operation of the second body 3102 is performed in the reverse order of the opening procedures. At this time, also, if the user pushed to move the second plate 3120 to the transition point from the opened state, the second plate 3120, from beyond the transition point, can automatically be closed due to the resilient force of the compression spring 3160.

In addition, when the second body 3102 reaches its closing point, the second plate 3120 can remains in the closed state, due to the pushing force of the second block 3170 caused by the elastic force of the compression spring 3160.

Hereafter, the fourth embodiment of the invention will be described in detail, with reference to the accompanying drawings.

First, referring to FIG. 18, the sliding mechanism of a portable terminal according to this embodiment of the invention includes a fixing plate 4120 preferably made of a plastic material, a slider plate 4110 preferably made of a plastic material, a zigzag spring 4134A, 4134B disposed between the fixing plate 4120 and the slider plate 4110, and a sliding-guide means 4114A, 4114B, 4124A, 4124B, 4124A', 4124B', 4134A, and 4134B for guiding the sliding motion of the slider plate 4110 relative to the fixing plate 4120.

The fixing plate 4120 is combined with a main body (not shown) using various known methods such as crew connection and welding. The slider plate 4110 is coupled to a slider body (not shown) through various methods such as crew connection and welding. As shown in the figures, the fixing plate 4120 and the slider plate 4110 are slidably connected to each other through the sliding-guide means 4114A, 4114B, 4124A, 4124B, 4124A', 4124B', 4134A, and 4134B. The connection method is shown in FIG. 18 (dot line), and it should be noted that those skilled in the art can easily combine the fixing plate 4120 with the slider plate 4110, referring to the perspective view of FIG. 19. The sliding-guide means includes a through-hole 4124A, 4124B, 4124A' and 4124B' for a fixing plate side guide rod, a through-hole 4114A and 4114B for a slide plate side guide rod, and a sliding-guide rod 4134A and 4134B to be slidably inserted into the through-holes. Although the through-hole 4124A, 4124B, 4124A' and 4124B' for a fixing plate side guide rod, the through-hole 4114A and 4114B for a slide plate side guide rod, and the sliding-guide rod 4134A and 4134B are illustrated as having a circular cross-section in FIG. 18 and other figures, they may have other forms of cross-sections, for example, triangular or rectangular cross-sections, as long as they are slidable. Although not illustrated in FIG. 18 and other figures, it should be understood that the end portion of the fixing plate side guide rod 4124A and 4124B is closed in order to fix the guide rods 4134A and 4134B.

The above sliding mechanism 4100 includes one or more resilient member for adjusting sliding of the slider plate 4110 relative to the fixing plate 4120, for example, a first resilient member (to the left side in the figures) and a second resilient member (to the right side in the figures). One end of the first resilient member 4242A is supported by the fixing plate 4120 and the other end thereof is supported by the slider plate 4110. Similarly, one end of the second resilient member 4142B is supported by the fixing plate 4120 and the other end thereof is supported by the slider plate 4110. However, one end of the first resilient member 4142A and one end of the second resilient member 4142B are placed in different levels, and the other end of the first resilient member 4142A and the other end of the second resilient member 4142B are placed in different levels so as not to be overlapped with each other. In addition, both ends of the first resilient member 4142A and both ends of the second resilient member 4142B are rotatably connected to the fixing plate 4142 and the slider plate 4110 at 4111A, 4122B, 4112A and 4112B. The term "level" in the description should be understood as defined above. In the preferred embodiment of the invention, the first resilient member 4142A and the second resilient member 4142B includes a zigzag spring. Distance between the one end of the first resilient member 4142A and the one end of the second resilient member 4142B is preferred to be larger than that between the other end of the second resilient member 4142A and the other end of the second resilient member 4142B in terms of force concentration.

FIGS. 19 to 21 show the sliding mechanism when the portable terminal is closed (a perspective view, an elevation, and a side view respectively). Referring to FIGS. 19 to 21, as described above, one end of the first resilient member 4142A is supported at the fixing plate 4120 and the other end thereof is supported at the slider plate 4110. At the transition point (S: halfway of d), the first resilient member 4142A exerts a resilient force in the direction of closing the slider plate 4110 and in the lateral direction (a first lateral direction), which is perpendicular to the moving direction of the slider plate 4110. At the transition point S, when the slider plate 4110 is close to its opening position, the first resilient member exerts the resilient force in the direction of opening the slider plate 4110, i.e., in the first lateral direction. As described above, one end of the second resilient member 4121B is supported at the fixing plate 4142 and the other end thereof is supported at the slider plate 4110. At the transition point S, when the slider plate 4110 is close to its closing position, the second resilient member 4142B exerts the resilient force in the closing direction of the slider plate 4110 and in a direction (a second lateral direction), which is the opposite direction to the first lateral direction. When the slider plate 4110 is close to its opening direction, the second resilient member exerts its resilient force in the opening direction of the slider plate 4110 and in the second lateral direction. That is, the first resilient member 4142A and the second resilient member 4142B is configured such that they exert their resilient force in different lateral directions for the moving directions of the slider plate 4110. This is because, in case where a single resilient member is used or two resilient members generate their resilient force in the same lateral directions, the slider plate 4110 exerts a force on the fixing plate 4120 in preferential fashion. Therefore, the sliding-guide rods 4143A and 4143B, the slider plate side guide rod through-holes 4114A and 4114B, and the fixing plate side guide rod through-holes 4124A, 4124B, 4124A' and 4124B' may be damaged or wore within a short period of time. In this embodiment, the transition points of the first resilient member 4142A and the second resilient member 4142B are made to be aligned with each other, thereby enabling a smooth operation of the slider plate 4110.

FIGS. 22 to 24 show the sliding mechanism of this embodiment when the portable terminal is completely opened (a perspective view, an elevation and a side view respectively). The opening operation of the sliding mechanism is performed in the reverse order to the above-described closing operation, and thus details thereon will not be explained here.

In this embodiment, the first resilient member 4142A and the second resilient member 4142B employ a zigzag spring, as described above. This spring enables a slim type portable terminal. More specifically, the space D (in FIG. 18) between the fixing plate 4120 and the slider plate 4110 is determined by the space occupied by the spring, but in this embodiment determined by the diameter of the wire forming the spring. If a torsion spring is used instead of the zigzag spring, the space must be twice the wire diameter. Beside, in this case, the differential force in the sliding mechanism is relied on the angle adjustment of the torsion spring, and thus the force adjustment (or control) between the main body and the slider body of a portable terminal becomes difficult. That is, an impact may be imposed on the portable terminal. Without a separate impact absorber or impact relief means, consequently the portable terminal shortens its life span. In addition, if a compression spring is used instead of a zigzag spring, the space corresponding to the internal space of the wound compression spring and twice the diameter of the spring wire will be required. In this embodiment, however, the resilient member, i.e., the zigzag spring can prevent the above problems associated with the torsion spring and the compression spring. In other senses, the above zigzag spring can be utilized because both ends of the first resilient member 4142A and both ends of the second resilient member 4142B are placed in different levels so as not be overlapped with each other.

Hereinafter, a fifth embodiment of the invention will be explained.

FIG. 25 is an exploded perspective view of a mechanism for slidably opening and closing a portable communication terminal according to the fifth embodiment of the invention. FIG. 26 shows an assembled state of the sliding mechanism of FIG. 25. FIG. 28 shows a closed state of the sliding mechanism according to the fifth embodiment of the invention.

The main body 5010 constituting a portable terminal includes a keypad 5012 mounted at the lower end of the top surface thereof, and houses a main board for performing various functions. In addition, a liquid crystal window 5022 is installed in the display 5020, and the display 5020 and the main body 5010 are electrically connected with each other through a flexible printed circuit board.

The sliding mechanism for opening and closing the slider body from the main body of the portable terminal includes a first plate 5100 combined with the main body 5010, a second plate 5120 coupled to the display 5020 so as to be slid in one direction from the first plate 5100 and including one or more inclined face 5130 having a transition point 5132 at its center where inclination direction thereof is reversed, a resilient means for generating a resilient force in a direction perpendicular to the moving direction of the second plate 5120, a connection member for fixing the resilient means to the first plate 5100, and one or more slip member for receiving the resilient force from the resilient means and transferring it to the inclined face 5130 such that the second plate 5120 can be slid from the first plate 5100.

The inclined face 5130 is formed in the second plate 5120 such that each is placed at both sides of a symmetrical point thereof, and the distance of both inclined faces 5130 is minimized from the transition point.

In addition, the resilient member, the connection member and the slip member are formed in pairs in symmetrical positions.

One or more guide rod 5150 is fixed to the second plate 5120 in the moving direction thereof. The first plate 5100 has a guide hole 5102 formed such that the guide rod 5150 can be slidably coupled thereto. Thus, the first plate 5100 and the second plate 5120 are slidably connected with each other by means of the connection of the guide rod 5150 with the guide hole 5102.

In both end portions of the second plate 5120 is formed a connection hole 5122 to which the guide rod 5050 is to be inserted, and both end portions of the guide rod 5150 is coupled to the connection hole 5122.

The resilient means is formed of a torsion spring 5160.

The connection member is formed of one or more links 5170, by which the resilient means are supported at the first plate 5100 in such a way that one end of the link is shaft-supported at the first plate 5100 and the other end thereof is shaft-supported at the end portion of the resilient member. Each link 5170 is rotatably installed in the first plate 5100 by means of a first central shaft 5180. The first central shaft 5180 constitutes a rotation center of the line 5170.

In order to install the torsion spring 5160, each end of the torsion spring 5160 is bend to form a hook 5162 and each link 5170 has a protrusion 5172 to be engaged with the hook 5162. Each protrusion 5172 is engaged with the respective hooks 5162 so that each end portion of the torsion spring 5160 is rotatably coupled to the link 5170.

The slip member is formed of a roller 5190, which is supported at the link 5170 and rolls in the inclined face 5130 of the resilient member. The roller 5190 is rotatably installed in the link 5170 through a second central shaft 5192. The roller 5190 rolls in the inclined face 5130 in a way as to minimize the friction force.

When the roller 5190 is placed in a closing position of the inclined face 5130 with respect to the transition point 5132, the roller 5190 exert a force to the second plate 5120 in the closing direction. When the roller 5190 is placed in an opening position of the inclined face 5130, it exerts the force to the second plate 5120 in the opening direction.

In order to generate a retaining force when the second plate 5120 is placed in its closed position and opened position, a first fixing groove 5140 and a second fixing groove 5142 having a semi-circular shape are formed in both end portions of each inclined face 5130.

As described above, the portable terminal is configured such that when the display 5020 is opened in the main board of the main body 5010, the liquid crystal window is turned on, and the display 5020 is closed in the main body 5010, the liquid crystal window 5022 is turned off.

Hereinafter, the operation of this embodiment will be explained.

FIG. 27 is a plan view of the sliding mechanism of FIG. 26 where the second plate is closed. FIG. 29 is a plan view of the sliding mechanism of FIG. 26 where the second plated is being moved to the opened position. FIG. 30 is a plan view of the sliding mechanism of FIG. 26 where the second plate is moved to the opened position. FIG. 31 is a perspective view showing an opened state of the portable terminal of FIG. 28.

First, as shown in FIG. 27, when the portable terminal is closed, the second plate 5120 coupled to the display 5020 is pushed in one direction on the first plate 5100.

At this time, the link 5170, which receives the resilient force of the torsion spring 5160 supported at the first plate 5100, transfers the resilient force to the roller 5190. The roller 5190 is combined to the first fixing groove 5140 to restrain the second plate 5120 from moving.

At this state, in order to open the terminal, if the display 5020 is pushed by a hand, the display 5020 and the second plate 5120 is slid downwardly in FIG. 23. At this time, the first plate 5100 and the second plate 5120 are connected through the guide rod 5150 and thus the second plate 5120 performs a smooth linear motion.

If the second plate 5120 starts to open, both rollers 5190 is escaped from the first fixing groove 5140 and rolls on both inclined faces 5130. At first, the distance between both inclined faces is gradually decreased and thus the roller 5190 compresses the link 5170 and the torsion spring 5160. During this course of action, a desired resistant force occurs and thus a user must push the display 5020 to move the second plate 5120 until the roller 5190 reaches the transition point.

As shown in FIG. 28, if the roller 5190 moves beyond the transition point 5132, the distance between both inclined faces 5130 is gradually increased and the torsion spring 5160 is expanded. During this course of action, the expansion force of the torsion spring 5160 acts as a force of pushing the second plate 5120 in the opening direction through the roller 5190. Thus, after the roller 5190 passes the transition point, a user does not need to push the display 5020 and the second plate 5120 automatically moves to the open position.

As shown in FIG. 25, the display 5020 and the second plate 5120 are completely opened, the roller 5190 is again latched to the second fixing groove 5142 and thus a desired retaining force is generated. Thus, the second plate 5120 remains in its opened state.

When the display 5020 is opened, the keypad 5012 of the main body 5010 is opened and the liquid crystal window 5022 is turned on according to pre-established functions. Thus, a user can use inherent functions of the terminal.

On the other hand, in the state where the display 5020 is opened, a user can push the display 5020 in the opposite direction to the opening operation in order to close the portable terminal. The closing operation of the display 5020 is performed in the reverse order to the above-described opening operation.

In this embodiment, a torsion spring is used as the resilient member, but not limited thereto. For example, a compression spring, a leaf spring, etc may be applied to the sliding mechanism of the invention as long as they can generate a resilient force in both directions.

Hereinafter, a sixth embodiment of the invention will be explained.

FIG. 32 is an exploded perspective view of a mechanism for slidably opening and closing a portable communication terminal according to the sixth embodiment of the invention. FIG. 33 shows an assembled state of the sliding mechanism of FIG. 32. FIG. 34 shows a closed state of the sliding mechanism according to the sixth embodiment of the invention.

The main body 5010 constituting a portable terminal includes a keypad 5012 mounted at the lower end of the top surface thereof, and houses a main board for performing various functions. In addition, a liquid crystal window 5022 is installed in the display 5020, and the display 5020 and the main body 5010 are electrically connected with each other through a flexible printed circuit board.

The sliding mechanism for opening and closing the slider body from the main body of the portable terminal includes a first plate 5100 combined with the main body 5010, a second plate 5120 coupled to the display 5020 so as to be slid in one direction from the first plate 5100 and including a first inclined face 5130a having a first transition point 5132a at its center of which inclination direction thereof is reversed and a second inclined face 5130b having a second transition point 5132b at its center of which inclination direction thereof is reversed, a resilient means for generating a resilient force in a direction perpendicular to the moving direction of the second plate 5120, a connection member for fixing the resilient means to the first plate 5100, and one or more slip member for receiving the resilient force from the resilient means and transferring it to the inclined face 5130 such that the second plate 5120 can be slid from the first plate 5100.

The first inclined face 5130a and the second inclined face 5130b are placed respectively at symmetrical positions of the second plate 5120, and the distance between both first inclined faces 5130a. The distance between both second inclined faces 5130b are minimized at the first transition point 5132a and the second transition point 5132b respectively.

In addition, the resilient member, the connection member and the slip member are formed in pairs in symmetrical positions.

One or more guide rod 5150 is fixed to the second plate 5120 in the moving direction thereof. The first plate 5100 has a guide hole 5102 formed such that the guide rod 5150 can be slidably coupled thereto. Thus, the first plate 5100 and the second plate 5120 are slidably connected with each other by means of the connection of the guide rod 5150 with the guide hole 5102.

In both end portions of the second plate 5120 is formed a connection hole 5122 to which the guide rod 5050 is to be inserted, and both end portions of the guide rod 5150 is coupled to the connection hole 5122.

The resilient means is formed of a torsion spring 5160.

The connection member is formed of one or more links 5170, by which the resilient means are supported at the first plate 5100 in such a way that one end of the link is shaft-supported at the first plate 5100 and the other end thereof is shaft-supported at the end portion of the resilient member. Each link 5170 is rotatably installed in the first plate 5100 by means of a first central shaft 5180. The first central shaft 5180 constitutes a rotation center of the line 5170.

In order to install the torsion spring 5160, each end of the torsion spring 5160 is bend to form a hook 5162 and each link 5170 has a protrusion 5172 to be engaged with the hook 5162. Each protrusion 5172 is engaged with the respective hooks 5162 so that each end portion of the torsion spring 5160 is rotatably coupled to the link 5170.

The first plate 5100 is provided with a cover formed for preventing the resilient means from being escaped.

The slip member is formed of a roller 5190, which is supported at the link 5170 and rolls in the first inclined face 5130a and the second inclined face 5130b of the resilient member. The roller 5190 is rotatably installed in the link 5170 through a second central shaft 5192. The roller 5190 rolls in the first inclined face 5130a and the second inclined face 5130b in a way as to minimize the friction force.

When the roller 5190 is placed in a closing position on the first inclined face 5130a and the second transition point 5132b with respect to the first transition point 5132a and the second transition point 5132b, the roller 5190 exerts a force to the second plate 5120 in the closing direction. When the roller 5190 is placed in an opening position on the first inclined face 5130a and the second inclined face 5130b with respect to the first transition point 5132a and the second transition point 5132b, it exerts the force to the second plate 5120 in the opening direction.

In order to generate a retaining force when the second plate 5120 is placed in its closed position and opened position, a first fixing groove 5140 having a semi-circular shape are formed between the first inclined face 5130a and the second inclined face 5130b.

In addition, in order to generate a retaining force when the second plate 5120 is opened in opening direction of the keypad, a second fixing groove 5142 is formed in the remaining end portion of each first inclined face 5130a. In order to generate a retaining force when the second plate is opened in opening direction of a camera, a third fixing groove 5144 is formed in the end portions of each second inclined face 5130b.

As described above, the portable terminal is configured such that when the display 5020 is opened in the main board of the main body 5010, the liquid crystal window is turned on, and the display 5020 is closed in the main body 5010, the liquid crystal window 5022 is turned off.

Hereinafter, the operation of this embodiment will be explained.

First, as shown in FIG. 33, when the portable terminal is closed, the second plate 5120 coupled to the display 5020 is pushed in one direction on the first plate 5100.

At this time, the link 5170, which receives the resilient force of the torsion spring 5160 supported at the first plate 5100, transfers the resilient force to the roller 5190. The roller 5190 is combined to the first fixing groove 5140 to restrain the second plate 5120 from moving.

At this state, in order to open the terminal, if the display 5020 is pushed by a hand, the display 5020 and the second plate 5120 is slid downwardly in FIG. 33. At this time, the first plate 5100 and the second plate 5120 are connected through the guide rod 5150 and thus the second plate 5120 performs a smooth linear motion.

FIG. 35 is a perspective view of the sliding mechanism of FIG. 33 where the second plate is being opened in the opening direction of the keypad.

If the second plate 5120 starts to open, both rollers 5190 is escaped from the first fixing groove 5140 and rolls on both first inclined faces 5130a. At first, the distance between both first inclined faces 5130a is gradually decreased and thus the roller 5190 compresses the link 5170 and the torsion spring 5160. During this course of action, a desired resistant force occurs and thus a user must push the display 5020 to move the second plate 5120 until the roller 5190 reaches the first transition point 5132a.

If the roller 5190 moves beyond the first transition point 5132a, the distance between both first inclined faces 5130a is gradually increased and the torsion spring 5160 is expanded. During this course of action, the expansion force of the torsion spring 5160 acts as a force of pushing the second plate 5120 in the opening direction through the roller 5190. Thus, after the roller 5190 passes the first transition point 5132a, a user does not need to push the display 5020 and the second plate 5120 automatically moves to the open position.

FIG. 36 is a perspective view of the second plate of FIG. 35 where the second plate is opened in the opening direction of the keypad. FIG. 37 is a perspective view of the portable terminal of FIG. 34 where the display thereof is opened in the opening direction of the keypad.

If the display 5020 and the second plate 5120 are completely opened in the opening direction of the keypad, the roller 5190 is again latched to the second fixing groove 5142 and thus a desired retaining force is generated. Thus, the second plate 5120 remains in its opened state.

When the display 5020 is opened, the keypad 5012 of the main body 5010 is opened and the liquid crystal window 5022 is turned on according to pre-established functions. Thus, a user can use inherent functions of the terminal.

On the other hand, in the state where the display 5020 is opened, a user can push the display 5020 in the opposite direction to the opening operation in order to close the portable terminal. The closing operation of the display 5020 is performed in the reverse order to the above-described opening operation.

In a case where a user intends to use the portable terminal as a camera, he or she pushes the display 5020 downwardly in FIG. 33. At this time, the first plate 5100 and the second plate 5120 are connected through the guide rod 5150 and thus the second plate 5120 performs a smooth linear motion.

FIG. 38 is a perspective view of the sliding mechanism of FIG. 33 where the second plate is being opened in the opening direction of the camera.

If the second plate 5120 starts to open, both rollers 5190 is escaped from the first fixing groove 5140 and rolls on both second inclined faces 5130b. At first, the distance between both second inclined faces 5130b is gradually decreased and thus the roller 5190 compresses the link 5170 and the torsion spring 5160. During this course of action, a desired resistant force occurs and thus a user must push the display 5020 to move the second plate 5120 until the roller 5190 reaches the second transition point 5132b.

If the roller 5190 moves beyond the second transition point 5132b, the distance between both second inclined faces 5130b is gradually increased and the torsion spring 5160 is expanded. During this course of action, the expansion force of the torsion spring 5160 acts as a force of pushing the second plate 5120 in the opening direction through the roller 5190. Thus, after the roller 5190 passes the second transition point 5132b, a user does not need to push the display 5020 and the second plate 5120 automatically moves to the open position.

FIG. 39 is a perspective view of the second plate of FIG. 38 where the second plate is opened in the opening direction of the camera. FIG. 40 is a perspective view of the portable terminal of FIG. 34 where the display thereof is opened in the opening direction of the camera.

If the display 5020 and the second plate 5120 are completely opened in the opening direction of the camera, the roller 5190 is again latched to the third fixing groove 5144 and thus a desired retaining force is generated. Thus, the second plate 5120 remains in its opened state.

Accordingly, the camera 5014 of the main body 5010 is opened and thus a user can take a picture using the camera 5014.

On the other hand, in the state where the display 5020 is opened, a user can push the display 5020 in the opposite direction to the opening operation in order to close the portable terminal. The closing operation of the display 5020 is performed in the reverse order to the above-described opening operation.

In this embodiment, a torsion spring is used as the resilient member, but not limited thereto. For example, a compression spring, a leaf spring, etc may be applied to the sliding mechanism of the invention as long as they can generate a resilient force in both directions.

Hereinafter, a seventh embodiment of the invention will be explained.

FIG. 41 is an exploded perspective view of a mechanism for slidably opening and closing a portable communication terminal according to a seventh embodiment of the invention. FIG. 42 is a perspective view showing an assembled state of the sliding mechanism of FIG. 41. FIG. 44 is a schematic vertical cross-section of the portable terminal to which the sliding mechanism of FIG. 42 is applied.

The main body 7100 constituting a portable terminal includes a keypad mounted at the surface thereof, and houses a main board for performing various functions. In addition, a liquid crystal window is installed in a sub-body 7120, and the sub-body 7120 and the main body 7100 are electrically connected with each other through a flexible printed circuit board.

In order to slidably open and close the sub-body 7120 from the main body 7100, the main body 7100 is combined with a main plate 7130, and the sub-body 7120 is combined with a slider plate 7150, which is slidably coupled to the main plate 7130.

The above slider plate 7150 is provided with two slide grooves 7160 formed in the moving direction of the slider plate 7150.

In addition, the main plate 7130 is provided with two guide pin 7140 fixed thereto. The guide pins 7140 are slidably engaged with the slide groove 7160 such that the slider plate 7150 is slidably coupled to the main plate 7130.

A first connection hole 7132 is formed in the main plate 7130. In the guide pin 7140 is composed of a body section 7142 slidably inserted into the slide groove 7160, a inserting section 7144 coupled to the first connection hole 7132 and having a radius smaller than the body section 7142, and a head section 7146 having a radius larger than the body section 7142 and a diameter than the slider groove 7160 to thereby prevent the slider plate 7150 from being escaped from the main plate 7130.

The slider plate 7150 is provided with an expanded hole 7162 formed at one end portion of the slider groove 7160 in such a way that the expanded hole 7162 has a diameter larger than that of the head section 7146, which thereby can pass through the expanded hole 7162. In addition, a retaining member is installed for preventing the guide pin 7140 from moving into the expanded hole 7162, with the guide pin 7140 inserted into the slider groove 7160.

A second connection hole 7152 is formed in the slider plate 7150. In addition, the retaining member is composed of a press-insert section 7172 to be press??inserted into the second connection hole 7152, and a retaining pin 7170 contacted with the main plate 7130 to restrict the movement of the slider plate 7150.

In addition, the main plate 7130 is provided with a depression formed with a desired depth, to which the retaining pin 7170 is inserted.

With the above-described sliding mechanism, the head section 7146 of the guide pin 7140, which is combined with the main plate 7130, is inserted into the expanded hole 7162 of the slider plate 7150, and then the body section 7142 of the guide pin 7140 is moved into the slide groove 7160. In addition, when the retaining pin 7170 is press-inserted into the second connection hole 7152, the retaining pin 7170 is engaged with the depression 7134 of the main plate 7134 such that the guide pin 7140 is prevented from moving to the expanded hole 7162 and thus the guide pin 7140 is not escaped from the slider plate 7150.

On the other hand, a resilient member is provided for resiliently opening and closing the slider plate 7150.

At a certain point during the traveling path of the slider plate 7150, the resilient member exert a resilient force on the slider plate 7150 in the closing direction thereof when it is placed at closing position, or in the opening direction thereof when it is placed at opening position. Preferably, the resilient member is formed of a torsion spring 7180.

On the other hand, Korean Utility Model Application No. 2003-0000136 discloses an opening and closing apparatus, which has a thickness of around 3 mm. In contrast, the sliding mechanism of the present invention has a reduced thickness of 2 mm.

Hereinafter, the operation of this embodiment will be explained.

First, when the communication terminal is closed, as shown in FIGS. 42 and 44, the sub-body 7120 having an LCD window installed therein is overlapped with the main body 7100 to close it. At this time, the slider plate 7150 coupled to the sub-body 7120 remains at closed state since the resilient force of the torsion spring 7180 is exerted in closing direction.

At this state, when the sub-body 7120 is pushed by a hand in order to open the communication terminal, the sub-body 7120 slides together with the slider plate 7150. At this time, the body section 7142 of the guide pin 7140 fixed to the main plate 7130 guides the slide groove 7160 of the slider plate 7150 such that the slider plate 7150 can perform a smooth linear motion.

In this way, while the slider plate 7150 is opened, a force must be exerted to push the sub-body 7120 at the initial state in order to open the sub-body 7120. However, after passing the transition point of the torsion spring 7180, the resilient force of the torsion spring 7180 is exerted in opposite direction such that the slider plate 7150 is pushed in opening direction. Thus, from this point on, the slider plate 7150 is automatically moved to the open state, without exerting any force to the sub-body 7120.

FIG. 42 is a perspective view showing the open state of the sliding mechanism of the invention, and FIG. 45 is a vertical cross-section of the open state of the portable terminal.

If the sub-body 7120 is completely opened, the slider plate 7150 remains at the opened state, due to the pushing force of the torsion spring 7180.

If the sub-body 7120 is opened, the keypad of the main body 7100 is opened, so that a user can use the inherent functions of the communication terminal.

On the other hand, in order to close the sub-body 7120 from the opened state, the user pushes the sub-body 7120 in opposite direction to when being opened. The closing operation of the sub-body 7120 is performed in the opposite orders of the opening thereof.

Hereafter, the sliding mechanism according to an eighth embodiment of the invention will be described in detail, with reference to the accompanying drawings.

FIG. 46 is an exploded perspective view of a mechanism for slidably opening and closing a communication terminal according to an eighth seventh embodiment of the invention. FIG. 47 is a perspective view showing an assembled state of the sliding mechanism of FIG. 46.

In addition, FIG. 48 is an enlarged perspective view showing the rear side of reference numeral 8010 in FIG. 47. FIG. 49 is an enlarged perspective view partially showing the rear side of reference numeral 8020 in FIG. 47 before assembling the second plate 8100.

The sliding mechanism of this embodiment includes a first body (not shown) constituting a main body housing a main board for performing various functions of a portable terminal, a second body (not shown) with a display mounted thereon and slidably moving in one direction from the first body, a guide rod 8300 disposed in the moving direction of the second body (not shown), a first plate 8200 connected and fixed with the first body (not shown) and having a guide groove 8230 to be connected with one side of the circumferential face of the guide rod 8300, a second plate 8100 fixed with the second body (not shown) and a guide rib 8120 to be slidably connected to the other side of the guide rod 8300 coupled to the first plate 8200, and a damper 8400 for absorbing impact caused when the second plate 8100 slidably moves on the first plate 8200 and buffering the movement of the guide rod 8400.

In addition, preferably, a resilient means 8500 is provided for generating a resilient force while the second plate 8100 slidably travels.

The first body (not shown) and the second body (not shown) constitutes major parts of a portable terminal and are electrically connected through a flexible printed circuit board to communicate to each other and operate all together. The first plate 8200 is coupled to the first body (not shown) and the second plate 8100 is coupled to the second body (not shown), such that the second plate 8100 slidably moves in one direction of the first plate 8200.

This embodiment of the invention is designed so as to reduce multi-directional impact between the first and second plates, which may be caused while the second plate 8100 repeatedly moves relatively to the first plate 8200 and also reduce various adverse effects, which may be formed by various causes.

For this purpose, the guide rod 8300 is provided, which is formed of a material having a good surface smoothness and a good strength, so that the second plate 8100 can slide smoothly on the guide rod 8300, which is not easily deformed by repeated movements.

On the other hand, the guide rod 8300 is preferred to have a circular cross-section relative to the moving direction of the second plate 8100. Thus, when assembling each component of this embodiment, adverse effects on operation caused by clearance of the components can be reduced and assembling characteristics can be improved.

The first plate 8200 is provided with a guide groove 8230 formed at both side thereof, to which the guide rod 8300 is coupled in one direction of the sliding movement of the second plate 8100. An assembling hole 8220 is provided for mounting and fixing the guide rod 8300 to the guide groove 8230. The first plate 8200 includes a first connection hole 8210 to which one side of the resilient means 8500 is connected to generate a resilient force while sliding, and a connection section 8240 to which the damper 8400 is coupled.

The guide groove 8230 is connected closely contacted with one side of the circumferential face of the guide rod 8300. Thus, the guide groove 8230 is preferred to have a semicircular structure, according to the preferable circular cross-section of the guide rod 8300.

The second plate 8100 is provided with a guide rib 8120 formed to be connected to the exposed outer circumferential face of the guide rod 8300, which is connected to the first plate 8200. The second plate 8100 includes a second connection hole 8110 to which one side of the resilient means is coupled such that the first plate 8200 is automatically slid by means of a resilient force while slidably moving by means of an external force at the initial state.

Since the guide rib 8120 is structured to wrap around the circular cross-section of the guide rod 8300 together with the guide groove 8230, it is preferred to have a semicircular structure such that the second plate 8100 is connected thereto so as to be able to slidably move.

The damper 8400 has a structure corresponding to the connection section 8240 in order to be coupled to the connection section 8240 of the first plate 8200. The damper 8400 is provided with a connection hole 8410 through which the guide rod 8300 passes to be connected thereto.

The damper 8400 is connected to both sides of the guide rod 8300 respectively through the connection hole 8410 of the damper, and then inserted and fixed into the connection section 8240 of the first plate 8200. Practically, the guide rod 8300 is combined with the first plate 8200 through the damper 8400.

In addition, the damper 8400 is connected to both ends of the guide rod 8300 where the second plate 8100 slidably moves, so that it absorbs impact caused by the first and second plates 8200 and 8100 while slidably moving relative to each other. The damper 8400 is formed of an elastic material such that the guide rod 8300 can be prevented from being vibrated on the sliding axis and also in other directions.

In this embodiment, the damper 8400 is formed of a rubber material.

That is, the damper 8400 buffers to compensate for slight vibration of the guide rod 8300 in various directions, thereby further improving the assembling characteristic when assembling components. Also, the damper 8400 prevents the second plate 8100 from being deformed by repeated sliding motion and thus avoid mal-operation thereof, thereby enabling a smooth sliding movement.

The resilient means 8500 includes a first block through which the resilient means is rotatably connected to a first position of the first plate 8200 by means of a second hinge shaft 8600, a second block through which the resilient means is rotatably connected by means of a second hinge shaft 8600 to a second position of the second plate 8100 having a different traveling path from the first position, and a compression spring 8520 for generating a resilient force while the second plate 8100 slidably moves.

When the second plate 8100 is located in a closing position with respect to a transition point while the second plate 8100 moves, the first block 8510 is placed in a closing direction from the second block 8530. Thus, the resilient force of the resilient means 8500 is exerted in the closing direction of the second plate 8100.

When the second plate 8100 is placed in an opening position, the first block 8510 is placed in an opening position from the second block 8530. Thus, the resilient force of the resilient means 8500 is exerted in the closing direction of the second plate 8100.

Hereinafter, the operation of this embodiment will be explained.

Without any external force, the second plate 8100 remains in its closed state due to the pushing force of the first block 8510 caused by the resiliency of the compression spring 8520.

At this state, when the second body (not shown) is pushed by a hand in order to open the second plate 8100 where the display of a portable terminal is mounted, the second plate 8100 coupled with the second body (not shown) slidably moves. At this time, the guide rib 8120 of the second plate 8100 performs a linear movement by means of guide of the guide rod 8300 fixed to the first plate 8200.

During the linear movement, the damper 8400 resiliently buffers the vibration of the guide rod 8300 caused in a direction perpendicular to the sliding axis thereof, thereby allowing the second plate 8100 to slide more smoothly.

If the second plate 8100 is opened, the second plate 8100 pushes the first block 8510 and compresses the compression spring 8520 to thereby increase the resilient force. Thus, a force resistant to open the second plate 8100 occurs and the second plate 8100 continues to move beyond the transition point. Then, again the first block 8510 pushes the second plate 8100 in its opening direction, due to the resilient force of the compression spring 8520, and thus from this point, the second plate automatically moves to its opened position.

In addition, the second plate 8100 remains in its open state, due to the pushing force of the first block 8520 caused by the compression spring 8520.

The closing operation is performed in the reverse order to the above-described opening procedures.

In this way, while the second plate 8100 is opened and closed, the damper disposed at both ends of the sliding direction absorbs impact occurring between the first plate 8200 and the second plate 8100, thereby protecting the components housed in the portable communication terminal.

Although the present invention has been described with reference to several preferred embodiments, the description is illustrative of the invention and not to be construed as limiting the invention. Various modifications and variations may occur to those skilled in the art, without departing from the scope and spirit of the invention as defined by the appended claims.

INDUSTRIAL APPLICABILITY

As described above, the sliding mechanism of the invention is installed in a portable communication terminal such that, if a force is exerted initially on the sub-body, the sub-body is slidably and automatically opened and closed and then remains in its opened or closed state.

The invention claimed is:

1. A mechanism for slidably opening and closing a portable communication terminal, which includes a main body and a slider body capable of slidably traveling on the main body to open or close the terminal, the mechanism comprising:
a fixing plate coupled to the main body;
a slider plate coupled to the slider body in such a way as to slide with respect to the fixing plate;
a first zigzag spring disposed between the fixing plate and the slider plate, one end portion of the first zigzag spring being supported at a first position of the fixing plate and the other end portion thereof being supported at a second position of the slider plate; and a second zigzag spring disposed between the fixing plate and the slider plate, one end portion of the second zigzag spring being supported at a third position of the fixing plate and the other end portion thereof being supported at a fourth position of the slider plate;

the first and second zigzag springs being disposed in different levels so as not to interrupt each other;

the first, second, third, and fourth positions being determined such that the slider plate is resiliently biased towards closing direction when being closed and towards opening direction when being opened, at a certain transition point while the slider plate travels on the fixing plate;

wherein the first zigzag spring is disposed such that the slider plate is biased in one direction perpendicular to the sliding direction thereof, and the second zigzag spring is disposed such that the slider plate is biased in opposite direction to the one direction.

2. The mechanism according to claim 1, wherein traveling distance of the slider plate before the transition point is different from traveling distance beyond the transition point.

3. The mechanism according to claim 1, wherein both end portions of the first and second zigzag springs are rotatable with respect to the fixing plate and the slider plate respectively.

4. The mechanism according to claim 1, wherein distance between the one end portion of the first zigzag spring and the one end portion of the second zigzag spring is larger than that between the other end portion of the first zigzag spring and the other end portion of the second zigzag spring.

5. The mechanism according to claim 1, wherein the fixing plate and the slider plate are formed of a plastic material.

6. The mechanism according to claim 1, wherein the first and second zigzag springs are disposed in different levels so as not to be overlapped with each other.

7. A mechanism for slidably opening and closing a portable communication terminal, which includes a main body and a slider body capable of slidably traveling on the main body to open or close the terminal, the mechanism comprising:

a fixing plate coupled to the main body;

a slider plate coupled to the slider body in such a way as to slide with respect to the fixing plate;

a first zigzag spring disposed between the fixing plate and the slider plate, one end portion of the first zigzag spring being supported at a first position of the fixing plate and the other end portion thereof being supported at a second position of the slider plate;

a second zigzag spring disposed between the fixing plate and the slider plate, one end portion of the second zigzag spring being supported at a third position of the fixing plate and the other end portion thereof being supported at a fourth position of the slider plate;

the first and second zigzag springs being disposed in different levels so as not to interrupt each other;

the first, second, third, and fourth positions being determined such that the slider plate is resiliently biased towards closing direction when being closed and towards opening direction when being opened, at a certain transition point while the slider plate travels on the fixing plate;

wherein the first zigzag spring is disposed such that the slider plate is biased in one direction perpendicular to the sliding direction thereof, and the second zigzag spring is disposed such that the slider plate is biased in opposite direction to the one direction.

8. The mechanism according to claim 7, wherein both end portions of the first and second zigzag springs are rotatable with respect to the fixing plate and the slider plate respectively.

9. The mechanism according to claim 7, wherein traveling distance of the slider plate before the transition point is different from traveling distance beyond the transition point.

10. The mechanism according to claim 7, wherein distance between the one end portion of the first zigzag spring and the one end portion of the second zigzag spring is larger than that between the other end portion of the first zigzag spring and the other end portion of the second zigzag spring.

11. A portable communication terminal including the mechanism of claim 7.

12. The mechanism according to claim 7, further comprising a second zigzag spring disposed between the fixing plate and the slider plate, wherein the first and second zigzag springs are disposed in different levels so as not to be overlapped with each other.

13. The mechanism according to claim 7, wherein the first and second zigzag springs are disposed in different levels so as not to be overlapped with each other.

14. A mechanism for slidably opening and closing a portable communication terminal, which includes a first body and a second body slidably opening and closing the first body, the mechanism comprising:

a first plate partially coupled to the first body;

a second plate coupled to the rear face of the second body and slidably coupled to the first plate;

a pair of compression springs disposed between the first plate and the second plate, which are thereby resiliently connected to each other; and a U-shaped link member inserted inside the compression springs so as to guide the compression springs linearly and rotatably between the first plate and the second plate, the link member being opened at its one end;

wherein, at the instant when the second plate passes beyond a transition point, the second plate is accelerated along the first plate in the advancing direction thereof by means of the resilient force of the compression springs.

* * * * *